United States Patent
Sherman

(10) Patent No.: US 11,060,382 B2
(45) Date of Patent: Jul. 13, 2021

(54) IN SITU EXPANDABLE TUBULARS

(71) Applicant: Terves Inc., Euclid, OH (US)

(72) Inventor: Andrew Sherman, Mentor, OH (US)

(73) Assignee: Terves, LLC, Euclid, OH (US)

(*) Notice: Subject to any disclaimer, the term of this patent is extended or adjusted under 35 U.S.C. 154(b) by 0 days.

(21) Appl. No.: 16/410,332

(22) Filed: May 13, 2019

(65) Prior Publication Data

US 2019/0264543 A1    Aug. 29, 2019

Related U.S. Application Data

(60) Division of application No. 15/819,548, filed on Nov. 21, 2017, now Pat. No. 10,584,564, and a
(Continued)

(51) Int. Cl.

| | |
|---|---|
| *E21B 41/00* | (2006.01) |
| *C08K 3/08* | (2006.01) |
| *C08K 3/22* | (2006.01) |
| *E21B 29/10* | (2006.01) |
| *E21B 43/08* | (2006.01) |
| *F16L 55/163* | (2006.01) |
| *E21B 43/10* | (2006.01) |

(Continued)

(52) U.S. Cl.
CPC ............ *E21B 41/00* (2013.01); *C08K 3/08* (2013.01); *C08K 3/22* (2013.01); *E21B 29/10* (2013.01); *E21B 43/086* (2013.01); *F16L 55/163* (2013.01); *C08K 2003/0856* (2013.01); *C08K 2003/2206* (2013.01); *E21B 17/1042* (2013.01); *E21B 17/20* (2013.01); *E21B 21/003* (2013.01); *E21B 33/1208* (2013.01); *E21B 43/08* (2013.01); *E21B 43/103* (2013.01)

(58) Field of Classification Search
None
See application file for complete search history.

(56) References Cited

U.S. PATENT DOCUMENTS

| | | |
|---|---|---|
| 3,220,479 A | 11/1965 | Ortloff et al. |
| 4,064,211 A | 12/1977 | Wood |

(Continued)

FOREIGN PATENT DOCUMENTS

| | | |
|---|---|---|
| WO | 9315131 | 5/1998 |

OTHER PUBLICATIONS

US Search Authority, International Search Report and Written Opinion for corresponding PCT Application No. PCT/2017/062750 (dated Jan. 26, 2018).

*Primary Examiner* — Jeffrey D Washville
(74) *Attorney, Agent, or Firm* — Ulmer & Berne LLP; Brian E. Turung; Eric Robbins

(57) ABSTRACT

Expandable tube members that are fabricated from a composite material that includes a structural plastic, which structural plastic includes phase change materials that undergo a permanent expansion upon exposure to wellbore conditions. This permanent expansion of the structural plastic causes the expandable tube member to expand radially and/or longitudinally without the use of an expansion tool. The expandable tube member can be used to control fluid loss, patch wells, stabilize a formation in a wellbore, enhance flow, provide sand screening, and repair damaged pipes, casings, or liners.

24 Claims, 7 Drawing Sheets

Related U.S. Application Data continuation-in-part of application No. 14/940,209, filed on Nov. 13, 2015, now Pat. No. 10,106,730.

(60) Provisional application No. 62/427,328, filed on Nov. 29, 2016, provisional application No. 62/080,448, filed on Nov. 17, 2014.

(51) Int. Cl.
    *E21B 33/12* (2006.01)
    *E21B 21/00* (2006.01)
    *E21B 17/10* (2006.01)
    *E21B 17/20* (2006.01)

(56) References Cited

U.S. PATENT DOCUMENTS

| | | |
|---|---|---|
| 4,680,066 A | 7/1987 | Wood |
| 4,752,431 A | 6/1988 | Knowles |
| 4,770,562 A | 9/1988 | Muller |
| 5,040,283 A | 8/1991 | Pelgrom |
| 5,186,215 A | 2/1993 | Gilleland |
| 5,366,012 A | 11/1994 | Lohbeck |
| 5,634,743 A | 6/1997 | Chandler |
| 5,667,011 A | 9/1997 | Gill et al. |
| 5,901,789 A | 5/1999 | Donnelly et al. |
| 5,925,409 A | 7/1999 | Nava |
| 6,752,208 B1 | 6/2004 | Nguyen |
| 6,775,894 B2 | 8/2004 | Hardin |
| 7,104,317 B2 | 9/2006 | Richard et al. |
| 7,159,673 B2 | 1/2007 | Van Dyjk |
| 7,478,686 B2 | 1/2009 | Richard et al. |
| 7,819,185 B2 | 10/2010 | Shuster |
| 8,800,650 B2 | 8/2014 | Spray et al. |
| 2001/0010782 A1 | 8/2001 | Corbetta |
| 2002/0092654 A1 | 7/2002 | Coronado et al. |
| 2003/0220039 A1 | 11/2003 | Chen et al. |
| 2004/0055758 A1* | 3/2004 | Brezinski ............ E21B 43/106 166/384 |
| 2006/0078682 A1 | 4/2006 | McDaniel et al. |
| 2006/0192039 A1 | 8/2006 | Smith |
| 2007/0277972 A1 | 12/2007 | Shuster et al. |
| 2008/0115931 A1 | 5/2008 | Shuster |
| 2008/0125335 A1* | 5/2008 | Bhavsar ................ E21B 34/00 507/219 |
| 2010/0038076 A1 | 2/2010 | Spray et al. |
| 2010/0059228 A1 | 3/2010 | Jones et al. |
| 2016/0138912 A1 | 5/2016 | Wang et al. |

\* cited by examiner

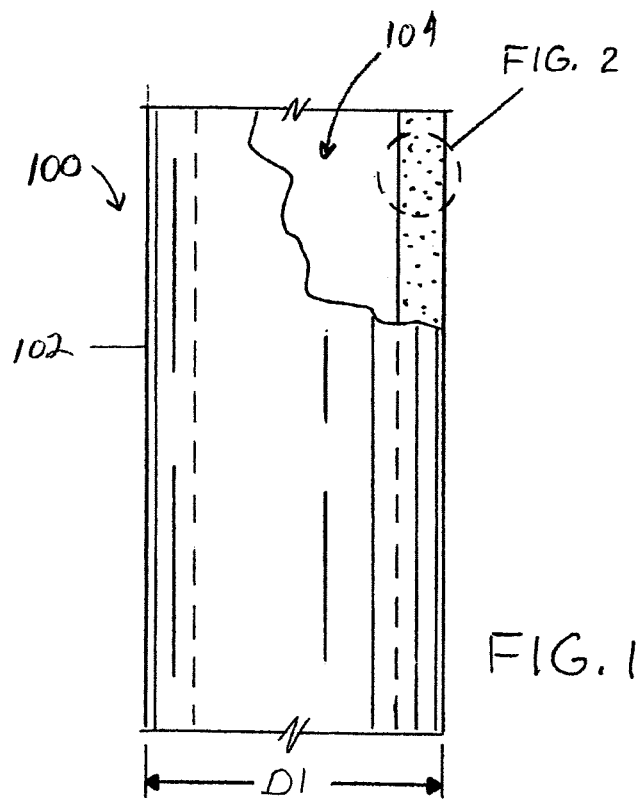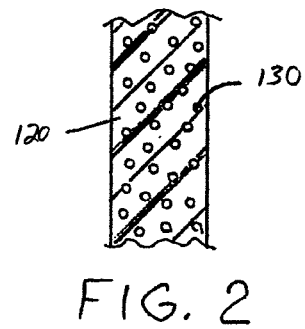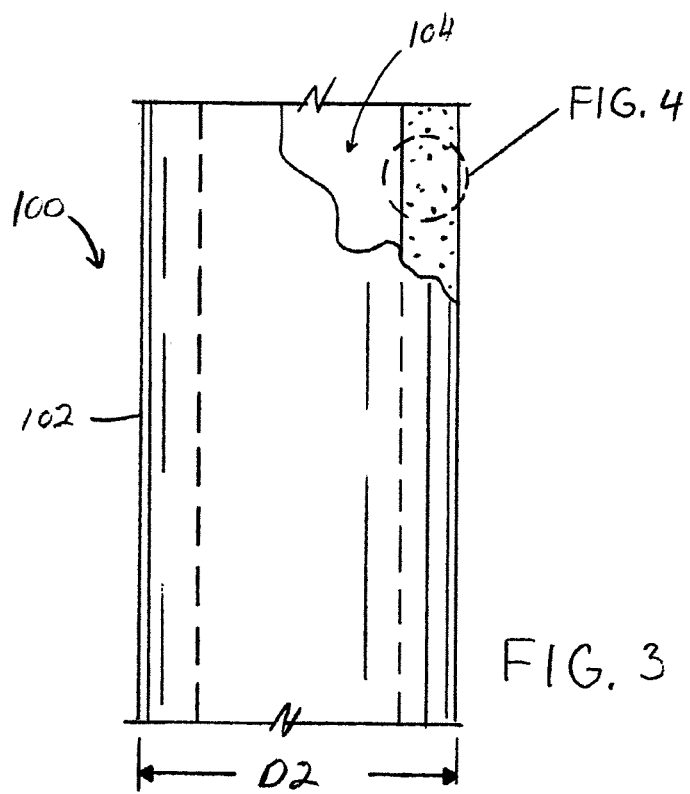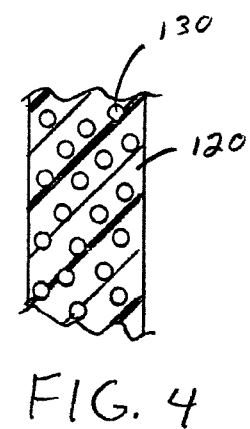

IN SITU EXPANDABLE TUBULARS

The present invention is a divisional of U.S. patent application Ser. No. 15/819,548 filed Nov. 21, 2017, wherein in turn claims priority on U.S. Provisional Patent Application Ser. No. 62/427,328 filed Nov. 29, 2016, which is incorporated herein.

The present invention is a continuation-in-part of U.S. patent application Ser. No. 14/940,209 filed Nov. 13, 2015, which in turn claims priority on U.S. Provisional Patent Application Ser. No. 62/080,448 filed Nov. 17, 2014, which are incorporated herein by reference.

FIELD OF THE INVENTION

The present invention relates generally to expandable pipes and patches for use in geologic structures, such as in operations related to the production of hydrocarbons (e.g., oil, gas, etc.), or oil field tubulars or tube members, and in similar wells and structures such as exploratory boreholes and wells, water wells, injection wells, monitoring and remediation wells, tunnels and pipelines. The invention relates to fluid loss control during drilling by use of the expandable pipes and patches. The invention is particularly directed to expandable structural plastics and the use of expandable structural plastics that have been formed into tube members that expand upon exposure to wellbore conditions. The tube members are fabricated from a structural plastic, which structural plastic includes phase change materials that undergo a permanent expansion upon exposure to wellbore conditions. This permanent expansion of the structural plastic causes the tube members to expand radially and/or longitudinally without the use of an expansion tool. The tube members can be used to control fluid loss, patch wells, stabilize a formation wellbore surface, enhance flow, provide sand screening, and to repair damaged pipes, casings, or liners.

BACKGROUND OF THE INVENTION

Despite a century of technological advances, drilling and construction of oil and gas wells remains a slow, dangerous, and expensive process. The costs associated with drilling some wells can exceed 100 million dollars. A significant contributor to these high costs is the suspension of drilling in order to repair geologically-related problem sections in wells. These problems can include, but are not limited to, lost-circulation, borehole instability, and well-pressure control. These problems are generally rectified by costly and time-consuming casing and cementing operations. Such conventional stabilization and sealing processes are required at each problem location, often dictating installation of a series of several diametrically descending, or telescopic-casing strings. Generally, a casing string formed of tube members is installed from the well surface to each problem zone; a 10,000-foot deep well often requires 20,000-30,000 feet of tube members because of overlapping sections.

Fluids such as oil, natural gas and water are generally obtained from a subterranean geologic formation (a "reservoir") by drilling a well that penetrates the fluid-bearing formation. Once the well has been drilled to a certain depth, the well hole or borehole wall must be supported to prevent collapse. Conventional well drilling methods involve the installation of a casing string and cementing between the tube members and the borehole to provide support for the borehole structure. After cementing a casing string in place, the drilling to greater depths can commence. After each subsequent casing string is installed, the next drillbit must pass through the inner diameter of the casing. In this manner, each change in casing diameter requires a reduction in the borehole or wellhole diameter. This repeated reduction in the borehole diameter creates a need for very large initial borehole diameters to permit a reasonable pipe diameter at the depth where the wellbore penetrates the fluid-bearing formation. The need for larger boreholes and multiple casing strings results in more time, material and expense being used than if a uniform size borehole could be drilled from the surface to the fluid-bearing formation.

Various methods have been developed to stabilize or complete uncased boreholes. U.S. Pat. No. 5,348,095 discloses a method involving the radial expansion of a casing string to a configuration with a larger diameter. Very large forces are needed to impart the radial deformation desired in this method. In an effort to decrease the forces needed to expand the casing string, methods that involve expanding a liner that has longitudinal slots cut into it have been proposed (See U.S. Pat. Nos. 5,366,012 and 5,667,011). These methods involve the radial deformation of the slotted liner into a configuration with an increased diameter by running an expansion mandrel through the slotted liner. These methods still require significant amounts of force be applied throughout the entire length of the slotted liner.

During drilling of the borehole, drilling fluid is generally pumped through the drillstring to the lower end of the string. The drilling fluid then returns to the well surface via the annulus formed between the drillstring and the borehole wall. The circulating drilling fluid transports the drill cuttings to the well surface, controls the wellbore pressure, and cools the drillbit. A frequently encountered problem in the practice of drilling wellbores is leakage of drilling fluid from the borehole into the surrounding earth formation. Some leakage of the drilling fluid is generally considered allowable; however, in many instances the amount of leakage is such that further drilling is not allowable without first taking corrective measures. Such heavy drilling fluid losses can occur, for example, during drilling through depleted sandstone reservoirs and/or through unstable shales. Attempts have been made to stabilize shale problem regions by applying a drilling fluid having a relatively high specific weight. However, the weight of such heavy drilling fluid can be close to, or in excess of, the fracturing pressure of neighboring sandstone formations, thus causing damage to such formations.

Conventional corrective measures to address leakage of drilling fluid include pumping of lost circulation material (LCM) through the wellbore in order to plug the formation, pumping cement into the wellbore, or installing a casing or liner in the wellbore at the location of the fluid losses. The latter corrective action is the only feasible option where the fluid losses are severe. Traditionally, installing a casing or liner in the wellbore has been done by retrieving the drillstring from the wellbore or borehole and then running the casing/liner into the borehole, and thereafter cementing the casing/liner in place and waiting for the cement to harden. Such a process is a time consuming and costly procedure. Moreover, temporary measures to reduce the losses of drilling fluid to acceptable levels have to be taken before retrieving the drillstring from the borehole.

More recently, mechanical, or shape memory alloy or polymer (heat activated) expandable sleeves have been proposed; however, methods and devices for reliably deploying these expandable loss circulation patches have not been effectively demonstrated. The energy industry has pursued development of plastically-deformed expandable well-casings and single diameter well-casing systems (also known as "mono-diameter" or "mono-bore") wherein a one size casing is used from the well surface to the target zone of the problem area, typically some 1-7 miles below the well surface. Single diameter well-casing systems can be used to replace former surface-to-problem-zone casing string installation with discrete-zone placement of an expandable casing. For example, a median casing size of 9⅝ inch outside diameter in an un-expanded state can be passed through a casing in the unexpanded state; the unexpanded casing can then be expanded to function in a nominal 10 inch to 12 inch borehole by means of a cold-work, mechanical steel deformation process performed in situ. The expanded casing assembly must, however, meet certain strength requirements and allow passage of subsequent 9⅝ inch outer diameter casing strings as drilling deepens and new problem zones are encountered.

This deforming process inherently requires use of relatively soft steels which may not provide the desired mechanical properties required in the environments of oil and gas wells. It is believed that most potential users cannot utilize current expandables due to fundamentally unsolvable technical or economic issues. For example, it is believed that conventional expandable tube members do not provide a good seal because they do not conform adequately to the irregular wall surfaces of wells when expanded. Expandable tube members that are made of steel materials have a natural tendency to "spring back" from their altered states after being expanded to their natural or original form. Spring back is also sometimes referred to as "recovery", "resilience", "elastic recovery", "elastic hysteresis", and/or "dynamic creep". Spring back exists in all stages of worked materials. For pre-ruptured tube members, different degrees of deformity throughout the thickness of the tube-arc can translate into spring back rates that vary according to the severity of arc resulting from the deformation. As a result, it is believed that conventional expandable tube members can never properly form a seal in a problem area.

Furthermore, plastic deformation of the metal tube is achieved by forcing an expansion device, such as a plug or a mandrel, into the interior of the tube member to expand and deform the metal tube member. The expansion device can be (1) forced downward through the tube member to deform it, (2) pulled upward through the tube member to deform it, (3) rotated within the tube member to deform it, or (4) some combination thereof. The expansion device can also have tapered wedges or rollers to facilitate in the deformation of the tube member. It is known that high levels of deformity can cause stress-cracking in the tube member, a variety of metallurgical problems in the tube member, and/or decreased mechanical properties of the tube member after deformation.

A further disadvantage of presently known expandable tube members is that, as the tube member is deformed radially, such outward radial expansion causes the overall length of the tube member to be shortened by some 1% to 3% or more. Such shrinkage along the longitudinal axis of the tube member is undesirable. An inability to supply extra material to the shrinkage can impede radial expansion of the tube member. For example, if the pre-expanded casing becomes "stuck" or otherwise placed into tension longitudinally, the need to service the shrinkage cannot be met and the deforming material becomes prematurely strained. This is also a major source of difficulty when expanding threaded connections.

Expanding metallic pipe downhole in a well has become more common. Casing, slotted liners, and screens have been expanded using a variety of techniques involving fluid pressure or a swage. The expansion of tube members has to date excluded the use of composites. Composites offer advantages of light weight, good chemical and thermal resistance properties, and low cost. The problem with composites and other non-metallics is that they are too brittle to withstand the significant expansion that would make them useful in a downhole application where expansion was contemplated.

Prior attempts to use composites were not readily adapted for downhole use for a variety of reasons. One example is disclosed in U.S. Pat. No. 4,752,431 wherein a member is provided in a limp condition and unrolled. The member comprises a sandwich of a cement layer between two layers that could be flexible plastic, rubber or canvas. When water or steam is circulated, the limp member assumes a cylindrical shape and the cement sets to provide rigidity to the member to form a final tube member. The application of this technology is for lining existing pipes such as those that cross under roads. A stated advantage of this technology is that the limp member can follow the contour of the land and then be hardened when pressurized with water. However, prior to the member being formed and set, the member cannot function as a member that is used to conduct fluid into a well and/or provide other functions of tubular members in a well.

U.S. Pat. No. 5,634,743 uses a flexible lining that contains a curable synthetic resin in conjunction with a device advanced with the lining to apply ultrasonic energy to the leading end of the lining, as the lining is unfurled along the center of the pipe to be lined.

U.S. Pat. No. 5,925,409 teaches a multi-step procedure where a resin-containing hydrogen material is reacted with a polycarbodiimide to make a tube that can be inserted into another tube for the purpose of lining it. The inner tube is inflated to contact the outer tube and then cured in place with hot air or water, electricity, or radiation. The liner tube is inflated as opposed to expanded. A similar concept is employed in German App. No. DE 3732694 A1.

U.S. Publication No. 2001/0010781 A1 involves putting cables in a strip and then inflating a liner over the strip. The final step is to set the body with hot water in the liner or heat from cables that run through the body.

WO 93/15131 teaches a technique for lining sewer pipes and the like wherein the liner is applied followed by the application of ultrasonic energy to liberate a microencapsulated catalyst. Alternatively, iron oxide particles are incorporated in the resin and are heated by applying electromagnetic energy. No expansion is contemplated in this process. Related to this technique are U.S. Pat. Nos. 4,064,211; 4,680,066; and 4,770,562.

Elastic memory composites and their ability to be deformed on heating and to hold the deformed shape on subsequent cooling, have been described in "Developments in Elastic Memory Composite Materials for Spacecraft Deployable Structures", IEEE (2001). These materials are disclosed as resuming their original shape when reheated. Shape memory materials and some of their uses are described in an article by Liang et al., "Investigation of Shape Memory Polymers and their Hybrid Composite", *Journal of Intelligent Materials Systems and Structures* (April 1997). Also of interest is Murphey et al., "Some Micromechanics Considerations of the Folding of Rigidizable Composite Materials", 19th AIAA Applied Aerodynamics Conference, Fluid Dynamics and Co-located Conferences https://doi.org/10.2514/6.2001-1418 (2001). Other patents of interest are U.S. Pat. Nos. 5,040,283; 5,186,215;

5,901,789; 6,752,208; 6,775,894; 7,104,317; 7,159,673; 7,478,686; 7,819,185; and 8,800,650.

Another problem with wells is that once a well is put in production, an influx of sand from the producing formation can lead to undesired fill within the wellbore and can thus damage valves and other production related equipment. Many methods have been attempted for sand control.

The present invention is directed to overcoming, or at least reducing, the effects of one or more of the problems set forth above, and can be useful in other applications as well.

SUMMARY OF THE INVENTION

The present invention is directed to expandable tube members that are fabricated from a structural plastic, which structural plastic includes phase change materials that undergo a permanent expansion upon exposure to wellbore conditions. This permanent expansion of the structural plastic causes the expandable tube members to expand radially and/or longitudinally without the use of an expansion tool. The expandable tube members can be used to control fluid loss, patch wells, stabilize a formation wellbore surface, enhance flow, provide sand screening, and to repair damaged pipes, casings, or liners. In one non-limiting embodiment, the tube member is a cylindrically shaped structure prior to being expanded and which maintains or substantially maintains its cylindrical shape as the tube member is inserted into a wellbore. The tube member, prior to being expanded, does not require any force to maintain its cylindrical shape, to have fluid flowing through the tube member to maintain its cylindrical shape, or to be otherwise formed into a cylindrical shape prior to, during or after the tube member is inserted into a wellbore.

In recent years, the oil and gas exploration and production industry has increased use of expandable metal tubing for use as bore-lining casing and liner, in straddles, and as a support for expandable sand screens. Various forms of expansion tools have been utilized. Some of the earlier uses included expansion dies, cones and mandrels which are pushed or pulled through metal tubing by mechanical or hydraulic forces to cause the metal tubing to bend or otherwise deform. More recently, rotary expansion tools have been employed. These tools feature rolling elements for rolling contact with the metal tubing to expand the metal tubing while the tool is rotated and advanced through the meal tubing. Spring loaded or spiral devices have been proposed, as well as precollapsed devices, including those incorporating shape memory alloys or polymers. Each of these expansion apparatus offers different advantages; however, each technique also has distinct limitations, such as the amount of expansion achievable, resulting mechanical properties of the expanded material, deployment time needed to achieve the desired amount expansion, requirements for intervention, etc. The present invention is an improvement of past expandable devices and is directed towards expandable tube member structures that can be used to provide support for drilled holes for use in oil and gas extraction.

One non-limiting aspect of the present invention is to form a tube member that includes an expandable, structural polymer, wherein the tubular member can be placed into a bore, liner, pipe, etc. and which, after exposure to certain conditions, causes an irreversible expansion reaction to occur in the tube member to cause the tube member to expand and form a larger diameter lining. The tube member is generally a cylindrical tube member having a generally rigid structure to enable the cylindrical tube member to maintain its shape as the cylindrical tube member is inserted into a wellbore or other subterranean structure. As such, prior to expansion, the tube member can function as a support for drilled holes for use in oil and gas extraction without any further modification to the cylindrical tube member. As can be appreciated, although the tube member is generally a cylindrical tube member having a cavity having a generally constant circular shape along all or a majority of the longitudinal length of the tube member, the tube member can have other shapes and/or cavity shapes.

The tube member can optionally be formed of a body that is substantially non-expandable and which body includes one or more sealing elements such as, but not limited to, an elastomer, tacky substance, visocoelastic material, expandable or swellable rubber, expandable or swellable plastic or polymer material, expandable or swellable plastic or polymer composite material, etc., to form a temporary or permanent seal between the outer surface of the body of the tube member and another surface (e.g., well bore wall, another pipe, etc.) so as to inhibit or prevent fluid flow between the outer surface of the tube member and the other surface. In one non-limiting embodiment, the outer surface of the body of the tube member includes one or more cavities, grooves, depressions, etc. that partially or fully contain one or more of the sealing elements. The number, size, shape and location of the one or more cavities, grooves, depressions, etc. on the outer surface of the body of the tube member is non-limiting. When the tube member includes one or more sealing elements, the body of the tube member can be configured to not expand and only the one or more sealing elements are configured to expand; however, this is not required. However, it can be appreciated that all or a portion of the body can be configured to expand to cause the body to expand prior to, during, and/or after the expansion of the one or more sealing elements; however, this is not required.

In another and/or alternative non-limiting aspect of the present invention, the tube member is partially or fully formed of a composite material that includes an expandable filler, wherein the tube member can be placed into a bore, liner, pipe, etc. while maintaining its shape, and which, after exposure to certain conditions, causes an irreversible expansion reaction to occur in a portion or all of the tube member to cause the tube member to expand and form a larger outer cross-sectional area lining. The tube member can optionally include one or more slots or openings and/or can be permeable (fine holes or contain a filter media) for use in stabilizing a formation (such as sand) while allowing fluid to flow through the wall of the expandable tube member in the expanded and/or unexpanded state. As can be appreciated, the tube member can be configured such that the one or more slots or openings are formed during and after expansion of the tube member, or that the one or more slots or openings increase in size during and after expansion of the tube member; however, this is not required.

In another and/or alternative non-limiting aspect of the present invention, the one or more sealing elements (when used) and/or a portion or all of the tube member are fabricated from a composite material that contains a phase change or reactive expandable filler (hereinafter "expandable filler") that undergoes significant expansion upon activation of the expandable filler. In one non-limiting embodiment, the composite material forms 5-100% (and all values and ranges therebetween) of the one or more sealing elements (when used) or the tube member. In one non-limiting specific design, the composite material forms 25-100% (and all values and ranges therebetween) of the one or more sealing elements (when used) or the tube member, and typically the composite material forms 50-100% (and all values and ranges therebetween) of the one or more sealing elements (when used) or the tube member. Activation of the expandable filler can include a change in temperature from the surface of a wellbore to a particular location in the wellbore, by a change in pH about the expandable filler, controlling salinity about the region of the expandable filler, by the addition or presence of a chemical (e.g., $CO_2$, etc.) to react with the expandable filler, and/or by electrical stimulation (e.g., introducing an electrical current, current pulse, etc.) to the expandable filler, exposure of the expandable filler to certain fluid compositions, exposure of the expandable filler to certain pressures, exposure of the expandable filler to certain electromagnetic waves, exposure of the expandable filler to certain sound waves, among others. In one specific non-limiting arrangement, the expandable filler is present in the sealing element or tube member from 10-80 vol. % (and all values and ranges therebetween), and more typically 20-40 vol. %. In another non-limiting arrangement, the expandable filler is present in the composite material that is used to partially or fully form the sealing element or tube member from 10-80 vol. % (and all values and ranges therebetween), and more typically 20-40 vol. %. In still another non-limiting arrangement, the expandable filler is present in the composite material that includes a polymer material and the expandable filler, wherein the composite material is used to partially or fully form the sealing element or tube member, and the expandable filler in the composite material constitutes from 10-80 vol. % (and all values and ranges therebetween) of the composite material, and more typically 20-40 vol. % of the composite material.

In another and/or alternative non-limiting aspect of the present invention, the expandable filler is present in the tube member or the composite that is used to form the tube member to cause the outer cross-sectional area of the tube member to expand 5-70% (and all values and ranges therebetween). In one non-limiting embodiment of the invention, the expandable filler is present in the tube member to cause the tube member to have 3-35% linear expansion of the tube member (and all values and ranges therebetween). In one specific non-limiting design, the tube member can be made such that the outer cross-sectional area of the tube member is caused to expand 5-30%. For example, a tube member having an outer diameter of 4.8" can be configured to expand to an outer diameter of 5.5" upon being activated. In another non-limiting examples, a tube member having an outer diameter of 8.4" can be configured to expand to an outer diameter of 9⅝" upon be activated. Such outer diameter expansion of the tube member enables the tube member prior to expansion to allow passage of a drillbit, or to slide over a drillstring and then be expanded to form a seal between the outer surface of the tube member and a surface (e.g., well bore wall, another pipe, etc.) to inhibit or prevent loss of fluid, to inhibit or prevent fluid flow between the outer wall of the tube member and a surface (e.g., well bore wall, another pipe, etc.) (e.g., well bore wall, another pipe, etc.), and/or or to resist overpressure from difficult areas of a formation, without having to trip the drillstring and line and cement the system.

In another and/or alternative non-limiting aspect of the present invention, the expandable filler is formulated to be activated by reacting with water to form oxides, hydroxides, or carbonates; however, this is not required.

In another and/or alternative non-limiting aspect of the present invention, the expandable filler includes particles that are caused to expand at least 2% as compared to the original particle sizes when the particle react with water, and typically at least about 20%. Generally, the volume expansion is up to about 200% (e.g., 2-200%, 20-200%, 42-141%, etc. and all values and ranges therebetween).

In another and/or alternative non-limiting aspect of the present invention, the polymer that includes the expandable filler can be or includes a thermoset or thermoplastic polymer wherein such polymer can include one or more compounds selected from the group of polyesters, nylons, polycarbonates, polysulfones, polyimides, PEEK, PEI, epoxy, PPS, PPSU, phenolic compounds, polyacetals, polysulfones, polyurea, epoxys, silanes, carbosilanes, silicone, polyarylate, and/or polyimide. In another non-limiting configuration, the polymer includes a thermoset or thermoplastic polymer that is capable of maintaining structural load at the wellbore temperatures.

In another non-limiting aspect of the present invention, there is provided an expandable filler that is configured and formulated to expand in a controlled or predefined environment. The composite material that includes the polymer and expandable filler generally has a compressive strength after expansion of at least 2,000 psig. The composite material that includes the polymer and expandable filler generally has a compressive strength after expansion of up to about 1,000,000 psig or more (e.g., 2,000 psig to 1,000,000 psig and all values and ranges therebetween). The composite material that includes the polymer and expandable filler typically has a compressive strength after expansion of at least 10,000 psig, and typically at least 30,000 psig. The compressive strength of the composite material that includes the polymer and expandable filler is the capacity of the composite material to withstand loads to the point that the size or volume of the composite material reduces by less than 2%.

In another non-limiting aspect of the present invention, the composite material that includes the polymer and expandable filler can be formulated to undergo a mechanical and/or chemical change after being activated, thereby resulting in a volumetric expansion of at least 2% and typically at least 50% (e.g., 2-5000% volumetric expansion and all values and ranges therebetween). In one non-limiting arrangement, the composite material is formulated to undergo a mechanical and/or chemical change resulting in a volumetric expansion of at least 20% by activation of the expandable filler in the composite material. In another non-limiting arrangement, the composite material can be permeable or semi-permeable to a liquid (e.g., water, brine, etc.) to enable the liquid to contact the expandable filler and cause activation of the expandable filler; however, this is not required. In one non-limiting arrangement, the composite material is semi-permeable when exposed to high temperatures (e.g., at least 100° F., typically 100-210° F. and all values and ranges therebetween) and/or exposed to high pressure liquid (e.g., at least 10 psig, typically 10-10,000 psig and all values and ranges therebetween) such as, but not limited to, water, brine, well drilling solutions, etc.

In another non-limiting aspect of the present invention, the reaction of the expandable filler during activation is selected from the group consisting of a hydrolization reaction, a carbonation reaction, and an oxidation reaction, or combination thereof; however, this is not required.

In another non-limiting aspect of the present invention, the expandable filler can include or be in the form of one or more materials selected from the group consisting of flakes, fibers, powders and nanopowders; however, this is not required. The expandable filler can form a continuous or discontinuous system in the composite material. The expandable filler can be uniformly or non-uniformly dispersed in the composite material.

In another non-limiting aspect of the present invention, the expandable filler can include one or more materials selected from the group consisting of Ca, Li, CaO, Li$_2$O, Na$_2$O, Fe, Al, Si, Mg, K$_2$O and Zn. The expandable filler generally ranges in size from about 106 μm to 10 mm (and all values and ranges therebetween). In one specific non-limiting configuration, the expandable filler includes, but is not limited to, CaO and/or MgO that is incorporated in polyester, nylon, polycarbonate, polyacetals, polysulfones, polyurea, epoxys, silanes, carbosilanes, silicone, polyarylate, and/or polyimid based polymers to form an expandable composite material. In another specific non-limiting configuration, the expandable filler includes, but is not limited to, nano and/or ultrafine Si metal, nano and/or ultrafine Mg, nano and/or ultrafine Fe, nano and/or ultrafine Zn and/or nano and/or ultrafine Al, sulfates, borates, and/or phosphates that are incorporated in polyester, nylon, polycarbonate, polyacetals, polysulfones, polyurea, epoxys, silanes, carbosilanes, silicone, polyarylate, and/or polyimide-based polymers to form an expandable composite material. In these two non-limiting configurations, the expandable filler is formulated to volumetrically expand upon reaction with a fluid (e.g., water, brine, etc.).

In another non-limiting aspect of the present invention, the composite material can include one or more activators or catalysts for accelerating the reaction of the expandable filler; however, this is not required. The catalyst can optionally include one or more materials selected from the group consisting of peroxide, metal chloride (e.g., AlCl$_3$, etc.), and/or a galvanically-active material. The amount of catalyst in the composite material (when used) is generally about 0.001-10 wt. % (and all values and ranges therebetween).

In another non-limiting aspect of the present invention, the composite material can include strengthening and/or diluting fillers; however, this is not required. The strengthening and/or diluting fillers can include one or more materials selected from the group consisting of fumed silica, silica, glass fibers, carbon fibers, carbon nanotubes and other finely divided inorganic material. The amount of strengthening and/or diluting fillers in the composite material (when used) is generally about 1-60 wt. % (and all values and ranges therebetween), typically 1-30 wt. %, and more typically 5-20 wt. %.

In another non-limiting aspect of the present invention, the tube member, the composite material and/or the expandable filler can include a surface coating or protective layer that is formulated to control the timing and/or conditions under which the activation of the expandable filler occurs; however, this is not required. The surface coating can be formulated to dissolve and/or degrade when exposed to a controlled external stimulus (e.g., temperature and/or pH, chemicals, etc.). The surface coating can include one or more materials such as, but not limited to, polyester, polyether, polyamine, polyamide, polyacetal, polyvinyl, polyureathane, epoxy, polysiloxane, polycarbosilane, polysilane, and polysulfone. The surface coating generally has a thickness of about 0.1 μm to 1 mm (and any value or range therebetween), and typically ranges from 10 μm to 100 μm.

In another non-limiting aspect of the present invention, the tube member, the composite material and/or the expandable filler and/or the structure (e.g., tube member, etc.) that is at least partially formed from the composite material and/or the expandable filler is generally configured to expand less than 5 vol. % prior to the expandable filler being activated. Typically, the tube member, the composite material and/or the expandable filler and/or the structure that is at least partially formed from the composite material and/or the expandable filler is configured to expand less than 2 vol. % prior to the expandable filler being activated, and more typically less than 1 vol. % prior to the expandable filler being activated, and still more typically less than 0.5 vol. % prior to the expandable filler being activated. Generally, the expandable filler is caused to be activate after the tube member or other structure that is partially or fully formed of the composite material and/or the expandable filler is inserted into well bore, and more typically is not activated until the tube member or other structure that is partially or fully formed of the composite material and/or the expandable filler is positioned in a desired region in the well bore; however, this is not required.

In another non-limiting aspect of the present invention, the tube member, the composite material and/or the expandable filler and/or the structure (e.g., tube member, etc.) that is at least partially formed from the composite material and/or the expandable filler is generally configured so that activation of the expandable filler can be accomplished by one or more events selected from the group consisting of a) change in temperature about the expandable tube member and/or the expandable filler from the surface of a ground cavity to a particular location in said ground cavity, b) exposure of the expandable tube member and/or the expandable filler to a certain temperature or temperature range, c) change in pH about the expandable tube member and/or the expandable filler, d) exposure of the expandable tube member and/or the expandable filler to a certain pH or pH range, e) change in salinity about the expandable tube member and/or the expandable filler, f) exposure of the expandable tube member and/or the expandable filler to a certain salinity or salinity range, g) exposure of the expandable tube member and/or the expandable filler to an activation element or compound, h) change in pressure about the expandable tube member and/or the expandable filler from the surface of a ground cavity to a particular location in said ground cavity, i) exposure of the expandable tube member and/or the expandable filler to a certain pressure or pressure range, j) electrical stimulation of the expandable tube member and/or the expandable filler, k) exposure of the expandable tube member and/or the expandable filler to a certain sound frequency, and/or l) exposure of the expandable tube member and/or the expandable filler to a certain electromagnetic frequency.

In still another non-limiting aspect of the invention, there is provided a method to control the rate and/or completion of the oxidation reaction through 1) control over the active particle surface area, 2) binder/polymer permeability control, 3) the addition of catalysis (e.g., AlCl$_3$—used to activate iron surfaces), and/or 4) control over water permeability/transport to the expandable filler surface. Ultrafine and near nanomaterials, as well as metallic flakes (which expand primarily in one direction) can be used to tailor the performance and response of the expandable filler. Mechanical properties such as modulus, creep strength, and/or fracture strength can also or alternatively be controlled through the addition of fillers and diluents (e.g., oxides, etc.) and semipermeable engineering polymers having controlled moisture solubility.

Expandable Chemistries

In still another non-limiting aspect of the invention, the expandable filler can undergo reactive mechanical or chemical changes occurring in the temperature range of at least 25° C. (e.g., 30-350° C., 30-250° C., etc. and all values and ranges therebetween) and having a volumetric expansion of over 10% (e.g., 20-400%, 30-250%, etc. and all values and ranges therebetween). Table 1 lists some non-limiting specific reactions of non-limiting expandable fillers:

TABLE 1

| | |
|---|---|
| $CaO \rightarrow CaCO_3$ | at least 119% expansion |
| $Fe \rightarrow Fe_2O_3$ | at least 115% expansion |
| $Si \rightarrow SiO_2$ | at least 88% expansion |
| $Zn \rightarrow ZnO$ | at least 60% expansion |
| $Al \rightarrow Al2O_3$ | at least 29% expansion |

The formation of hydroxides and/or carbonates can potentially result in larger expansion percentages.

Expandable Composite Material.

Non-limiting examples of expandable composite materials that can be used are set forth below.

Example 1

An expandable composite material was formed of high temperature resistant and tough thermoplastic polysulfone with 25% volumetric loading of expanding Fe micro powder. The expandable composite material exhibited an unconstrained volumetric expansion of 50% is in a solution of 2% KCl at 190° C. over a period of 50 hours.

Example 2

An expandable composite material was formed of 30% volumetric loading of expandable metal CaO powder in epoxy binder. The CaO powder was milled and sieved to 8/16 mesh size. The expandable composite material exhibited a 24% volumetric expansion while under 3,000 psig fracture load stress when exposed to a solution of 2% KCl, 0.5M $NaCO_3$ at 60-80° C. in a period of 1 hour.

Example 3

An expandable composite material was formed of 30% volumetric loading of expandable metal CaO powder in 6,6 nylon binder. The expandable composite material exhibited a 24% volumetric expansion under 2,500 psig fracture load stress when exposed to a solution of 2% KCl, 0.5M $NaCO_3$ at 60-80° C. in a period of 1 hour.

In another and/or alternative non-limiting aspect of the present invention, the tube member is fabricated from a structural polymeric composite material that can contain reinforcing fibers and/or wires to add strength and stiffness to the tube member; however, this is not required.

In another and/or alternative non-limiting aspect of the present invention, the tube member can be formed by extrusion, molding, or machining.

In another and/or alternative non-limiting aspect of the present invention, the tube member can be used, for example, to stabilize a formation, since the expansion of the tube member will cause deformation of the tube member so that the tube member conforms to the borehole geometry. Similarly, when the tube member is attached to a sealing surface, the expansion of the tube member can be used to isolate a certain well section (such as an open hole) to replace inflatable or swellable rubber packers with a considerably smaller or higher pressure rated system since much larger forces can be applied. When the expandable tube member is combined with a swellable elastomer, larger expansion ratios (larger gaps) can be effectively sealed.

In another and/or alternative non-limiting aspect of the present invention, the tube member can be installed/placed within a borehole in the unexpanded state. In the unexpanded state, the tube member can pass through the inner diameter of other tube members that have been deployed within the borehole. Once the tube member of the present invention has been properly positioned, the tube member can be irreversibly expanded upon activation (e.g., upon exposure to the wellbore conditions [certain fluid composition and/or certain temperature, etc.]). This expansion of the tube member can occur without the need for any other intervention other than exposure to an activator. As such, the tube member can be expanded without need for hydraulics, pulling drillstring expansion cones, or having other completion/activation strings involved to set the tube member. The expansion of the tube member can be accomplished in hours to days, and is largely controllable by engineering (e.g., controlling the permeability (primarily water diffusion and solubility) of the structural polymer matrix of the tube member, the size/surface area of the expandable filler in the composite material used in the tube member, and/or the temperature to which the tube member is exposed. As can be appreciated, the tube member can be activated for expansion by other or additional means.

In another and/or alternative non-limiting aspect of the present invention, the expandable tube member, when used to isolate the area of interest in a wellbore, can be run into the wellbore after previous strings of casing are already set within the wellbore. The expandable tube member that is used for isolating an area of interest is typically run through the inner diameter of a previous string of casing to reach the portion of the open hole wellbore slated for isolation, which is typically located below the previously set strings of casing. For loss circulation control, the expandable tube member typically is run over the drillstring and then expanded; the expanded tube member is typically configured such that the drillbit can still be removed through the expanded tube member.

In another and/or alternative non-limiting aspect of the present invention, the tube member can optionally include an additional material to provide sealing between the outer surface of the tube member and another structure (e.g., wellbore inner wall, inner wall of a string, etc.); however, this is not required. In one specific non-limiting arrangement, the tube member structure can be coated with, adhered to, or assembled with an elastomeric material, which may itself be swellable. The combination of a self-expanding tube member with a swellable elastomeric material (e.g., rubber, etc.) can create increased expansion, higher pressure ratings, and/or other advantages in a swellable packer type applications, as well as potentially being applicable to temporary or permanent sealing of pipeline leaks or perforations, such as during well rework. Adding rubber or elastomeric material elements, such as O-rings, wedge seals, or a continuous rubber or elastomeric material element on the outer diameter of the expandable tube member can be used to isolate zones from pressure incursions or leak-off. In addition to elastomeric and swellable elastomeric additions or the outer surface of the tube member, various adhesives, tacky materials, or viscoelastic materials can also or alternatively optionally be engineered for use to seal and/or conform the expandable tube member against an open hole, pipe, liner, or other wellbore surface. One or more portions or all of the outer surface or region of the tube member can optionally include an expandable composite material that is different from the material that forms the body of the tube member. In such a configuration, the body of the tube member may or may not be partially or fully formed of an expandable composite material. The tube member can be sealed either directly against a borehole (if the surface finish and area is large enough) or sealing elements can be added; however, this is not required. The entire outer diameter of the tube member, or some portion of the outer diameter, can be coated or attached to an elastomeric sealing element or coating; however, this is not required. The elastomeric material that is on the outer diameter of the tube member can itself be swellable to enhance sealing or decrease the difference between the initial and the final outer diameter sealing surface; however, this is not required. The elastomeric material or sealing element can be constrained and/or otherwise held in position by the tube member element to increase sealing ability, such as via an O-ring groove or wedge recession type configuration; however this is not required. The tube member includes an expandable elastomeric material or sealing element; the expansion of the elastomeric material or sealing element can cause seal compression as well as expansion to maintain an increase seal cross-section or pressure rating.

In another and/or alternative non-limiting aspect of the present invention, reinforcement materials (e.g., fibers, ribs, wires, sleeves, and/or or ribbons) can optionally be formed into and/or attached to the outer surface of the tube member to improve strength and control expansion (such as restraining axial expansion). The reinforcement materials can be arranged on a tube member to restrain axial expansion and force an increase in radial expansion in the tube member and prevent buckling in thinner sections when loading into the borehole or pipe. The reinforcement members can also or alternatively optionally be arranged radially in the tube member, most often at a controlled angle pattern, wherein the angle becomes shallower as expansion occurs and the bucking or burst strength is significantly increased. By controlling the angle of expansion, selection/properties, and content of the reinforcements, local stiffness can also be manipulated to enhance radial expansion.

In another and/or alternative non-limiting aspect of the present invention, the tube member can optionally include one or more pores, slots, or perforations. When the tube member includes one or more pores, slots, or perforations, such structures can be designed to cause the one or more pores, slots, or perforations to maintain their shape or be reduced in size or increased in size when the tube member is expanded; however, this is not required. By measuring the before and after dimensions, and via calculations, the permeability and flow cross-sectional area of the one or more pores, slots, or perforations can be precisely controlled when the tube member is expanded.

In another and/or alternative non-limiting aspect of the present invention, the tube member, prior to and/or after expansion, has a tensile yield strength above 5-10,000 psig, generally above 10,000 psig, and a compressive strength generally above 10,000 psig; however, this is not required. The expandable plastic modulus of the tube member, prior to and/or after expansion, can be above 0.25 MSI, and typically in the MSI range (with glass fiber and filler additions); however, this is not required.

In another and/or alternative non-limiting aspect of the present invention, during expansion of the expandable filler of the tube member, the polymer matrix of the tube member can be expanded to its yield point (generally around 10-18,000 psi for the polymer) where it is plastically strained, becoming thinner but having a larger diameter, until the expansion is completed. The expansion of the tube member can optionally be constrained by the outer pipe or borehole, such that the expandable tube member expands conformably, with the expansion being then constrained to increasing thickness rather than diameter, as the expansion would be in the unconstrained state. In one non-limiting arrangement, the tube member includes at least about 10 vol. % expandable filler, and typically at least about 30 vol. % expandable filler, and the outer diameter or cross-sectional area of the expandable tube member is configured to increase by at least about 12%. Selecting higher expansion fillers (e.g., such as borates) or increasing the amount of expandable filler in the tube member can be used to increase the amount of expansion of the tube member. The addition of inert fillers in the tube member such as, but not limited to, fumed silica, carbon black, glass flake or fiber, can be used to slow down the expansion rate of the expandable tube member, reduce the amount of expansion of the expandable tube member, increase the stiffness of the expandable tube member, and/or increase the yield strength of the expandable tube member.

In another and/or alternative non-limiting aspect of the present invention, there is provided an expandable tube member which includes an expandable composite material that includes a polymer matrix and expandable filler, wherein the tube member has a strength exceeding 5000 psig and a stiffness exceeding 0.2 MSI, and the expansion of the tube member is activated or triggered under controlled conditions of temperature, fluid (water or $CO_2$), pressure, and/or fluid composition (pH, salinity, etc.).

In another and/or alternative non-limiting aspect of the present invention, there is provided an expandable tube member that functions as a liner, a screen, a pipe section, a plug, a patch, a packer, or other downhole device.

In another and/or alternative non-limiting aspect of the present invention, there is provided an expandable tube member wherein the expandable composite material includes a water or $CO_2$ reactive expandable filler in a thermoplastic or thermosetting polymer matrix.

In another and/or alternative non-limiting aspect of the present invention, there is provided an expandable tube member wherein the expandable filler includes one or more materials selected from the group consisting of magnesium oxide, calcium oxide, lithium oxide, borate, selenium, iron, magnesium, manganese, germanium, calcium, aluminum, sodium, lithium, zinc, other oxidizable metal with a high Biddeford ratio, water- or $CO_2$-swellable clay, water- or $CO_2$-swellable phosphate, water- or $CO_2$-swellable carbide, water- or $CO_2$-swellable silicate, water- or $CO_2$-swellable borate, and water- or $CO_2$-swellable sulfate material.

In another and/or alternative non-limiting aspect of the present invention, there is provided an expandable tube member wherein the polymer in the expandable composite material is a thermoplastic or thermosetting polymer matrix that can be a thermoplastic or thermoset polymer having a plastic strain to failure of more than 10% (ASTM E606, ASTM F2018) and a strength above 5,000 psig (ASTM D638, ASTM D695).

In another and/or alternative non-limiting aspect of the present invention, there is provided an expandable tube member wherein the polymer in the expandable composite material is a thermoplastic or thermosetting polymer matrix that includes one or more compounds selected from the group consisting of nylon/polyarylates, polycarbonates, polysulfones, polyureas, polyesters, epoxys, polypropylene, polyethylene, and other engineering plastics.

In another and/or alternative non-limiting aspect of the present invention, there is provided an expandable tube member that includes one or more additional materials that form internal structures and/or reinforcements to increase burst and/or buckling limits of the expandable tube member, and/or to control and/or constrain expansion of the expandable tube member. The one or more additional materials that form internal structures and/or reinforcements can be selected from the group consisting of reinforcing fibers, flakes, ribbons, ribs, mesh, filler, and other internal structures.

In another and/or alternative non-limiting aspect of the present invention, there is provided an expandable tube member that can be used for the purpose of controlling lost circulation or fluid inflow during drilling operations.

In another and/or alternative non-limiting aspect of the present invention, there is provided an expandable tube member that can be used for the purpose of repairing or sealing a leak.

In another and/or alternative non-limiting aspect of the present invention, there is provided an expandable tube member that can be used for the purpose of stabilizing a wellbore, and wherein said expandable tube member structure can optionally be porous.

In another and/or alternative non-limiting aspect of the present invention, there is provided an expandable tube member that can include an elastomeric component, that is optionally constrained in a groove or slot on the expandable tube member (e.g., by an O-ring groove or wedge cutout, etc.) and/or adhered to the expandable tube member by an adhesive, melted bond, friction fit, mechanical attachment [e.g., snap, rivet, nail, screw, bolt, hook and loop fastener, etc.], etc. The elastomeric component can be an expandable or non-expandable material. The elastomeric component can be used to form a seal between the tube member and another structure (e.g., pipe, wellbore, etc.). In one non-limiting embodiment, the elastomeric component is a swellable rubber.

In another and/or alternative non-limiting aspect of the present invention, there is provided an expandable tube member that can be used as part of a swellable packer.

In another and/or alternative non-limiting aspect of the present invention, there is provided an expandable tube member that includes a degradable coating on an outer surface to control sliding friction and/or to control the speed and time at which the expansion of the tube member occurs.

In another and/or alternative non-limiting aspect of the present invention, there is provided an expandable tube member that can be deployed on a drillstring without tripping the string.

It will be understandable to one experienced in material science and oilfield drilling, completion, and intervention options that the expandable tube member can be designed and configured to fulfill a wide variety of uses beyond those specifically described herein. The present description of the invention is designed to highlight the invention and its usefulness in oil and gas completions and pipe repair, but does not cover all possible applications of the expandable tube member.

These and other advantages of the present invention will become more apparent to those skilled in the art from a review of the description of the preferred embodiment and claims, below.

BRIEF DESCRIPTION OF THE DRAWINGS

FIG. 1 illustrates a section of an unexpanded tube member that is formed of a composite material of an expandable filled in a polymer matrix;

FIG. 2 is an enlarged portion of the unexpanded tube member of FIG. 1;

FIG. 3 illustrates a section of the tube member of FIG. 1 after being expanded;

FIG. 4 is an enlarged portion of the unexpanded tube member of FIG. 3;

DETAILED DESCRIPTION OF THE INVENTION

Figure 5:
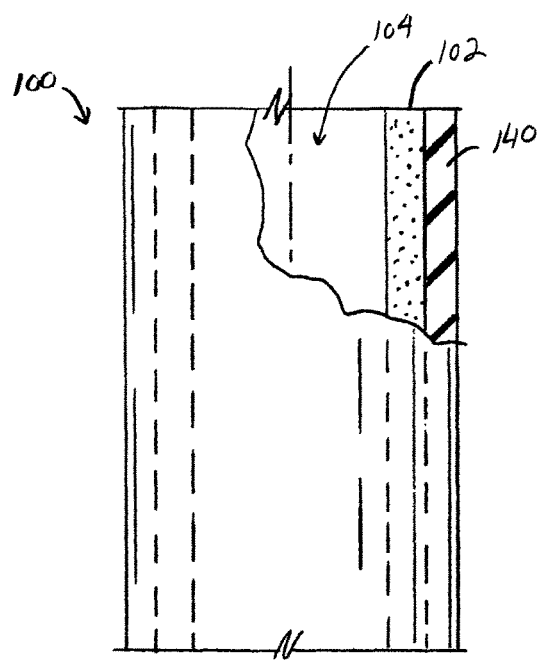
FIG. 5 illustrates a section of a tube member that includes an outer coating.

The present invention is directed to expandable tube members that are fabricated from and/or include a composite material. The composite material includes a structural plastic, which structural plastic includes phase change materials or expandable fillers that undergo permanent expansion upon exposure to wellbore conditions and/or after otherwise being activated. This permanent expansion of the composite material causes one or more portions of the tube member to expand radially and/or longitudinally without the use of an expansion tool. The expandable tube member can be used to control fluid loss, patch wells, stabilize a formation wellbore surface, enhance flow, provide sand screening, and/or to repair damaged pipes, casings, or liners.

The expandable tube member can be placed into a borehole in the ground or any other structure, and then expanded in situ through interaction with the local environment and/or by other activation means. In the unexpanded state, the tube member is able to fit within the inner diameter of a deployed or preexisting tube member, pipe, or wellbore. Once the expandable tube member is properly positioned (which may or may not include attachments to adjacent deployed tube members), it is expanded in situ until its outer surface is resisted by the rock borehole or existing pipe/tube member. The expanded tube member may penetrate into the walls of the borehole; however, this is not required.

In one non-limiting embodiment, the expandable tube member can include a strong plastic material that is formed into a generally cylindrical shape by such techniques as extraction, extrusion, injection or compression molding, pultrusion, fiber lay-up, filament winding, or some other technique. Once the tube member is placed into the well or pipe, the expandable filler in the composite material that is used to partially or fully form the tube member can be designed to react with the local environment and/or otherwise be activated to cause the expandable filler to expand, which in turn causes the composite material to expand and increase in volume. The expansion mechanism of the expandable filler can be oxidization (e.g., iron rusting or silicon oxidizing), hydration, carbonation, and/or chemisorption (e.g., swelling clays such as vermiculite-type material). The degree of expansion of the tube member can be selected for a specific application, and the tube member is generally configured to over-expand to ensure conformance and sealing of the outer bore or pipe.

The technological concept associated with the expandable tube member facilitates expansion reliability by performing most of the work through reactive phase change in expandable fillers in a polymer composite matrix under the action of time, temperature, and/or fluid chemistry. Once fabricated, the tube member is held in the smaller diameter and the energy used to reduce the outer diameter the tube member is stored in the compressed tube member. When the tube member is released, the outward expansion energy is released and the outer and inner diameters expand. By augmenting the tube member's natural bias, tremendous amounts of downhole work can be utilized to make very robust expandable tube members, which also provide high-pressure formation sealing capability as an integral benefit.

Since residual strain-energy is exerted against the formation (the expandable composite material expands up to its plastic limit), there is no "spring-back" effect by use of the expandable composite material. As such, the expandable tube member that is partially or fully formed by the expandable composite material provides a foundation for high-pressure annular sealing. The tube member's structure is deformable during expansion, making the tube member highly compliant to irregular wellbore surfaces. In one non-limiting application, the efficient use of composite material expansion forces is actually used to locally reshape geology according to the tube member's optimal fit. Contrary to other approaches seeking to comply with the well environment, the tube member does not substantially sacrifice strength properties as compliance is obtained. High-pressure sealing is one approach to provide integrated solutions and reduce standard well construction costs.

These spatial references as discussed in the present invention relate to the general shape of a cylinder having a circumference, a diameter and a length (as laid on the ground) or height (as lowered into a well). The height and length of the sleeve or casing in the wellbore is referred to as the "longitudinal direction". The expandable sleeves or tube members or casings of the present invention can form a cylindrical shape with a smaller outer diameter prior to use in wells, and their outer diameter can be optionally increased with deployment without surface intervention (e.g., automatic expansion when exposed to certain conditions, etc.).

The term "tube member" or "casing," as used herein, means a structure having a substantially cylindrical shape and is useful in geological structures. Non-limiting examples cover both open-hole and cased hole applications; delivery into the subsurface by conventional successive pipe string assemblies, integral as a sleeve about a pipe assembly, by wireline, coil-tubing, through-tubing, integral as whole sections of the drilling, testing or production assembly, freely dropped, pumped-in, one-trip, and no-trip delivery; conventional downhole product diameters, generally between 2.375" and 28", re-entry diameters, generally less than 5", micro-hole diameters generally less than 4.5", and large-diameter tube members and products, generally larger than 16"; well telescoping well construction types, nested construction, mono-diameter with overlap sections, mono-diameter without overlap sections, discrete section construction, discrete placement; covering sealing by flexible layers such as elastomers, integral sealing such as pliable arcuate plastic or metallic elements about the outer diameter, conjunctive with conventional sealants such as cements contained integral or subsequently delivered through ports; adhering the device by friction against geology or existing tube member, integrating with geology or existing tube member, penetrating geology or existing tube member, shaping local geology or existing tube member, include conventional terms-base pipes, casing, casing extensions, cladding, drilling sleeves, couplings or connections, drilling with casing, drive casing, hangers, heaters, instruments, integral drilling assembly tools, integral perforation charges, selectively perforated integral, isolation sleeves, fishing tools, liners, packers, patches, porous lost-circulation patches, screens, shoes, tools, and tubing. The tube members or casings of the present invention can be used in geologic structures, such as wells in the extraction of hydrocarbons, as well as for water and sewer pipes; however, the tube members or casing can be used for other applications.

The term "burst pressure" or "collapse pressure," as used herein, means that the tube member or casing can ultimately withstand certain amounts of internal or external pressure that exerts a radial or hoop force without becoming damaged. Generally, a leak path is not initiated at the specified burst or collapse pressure.

The expandable tube member and casing described herein are capable of radial expansion from an initial unexpanded state and, therefore, have at least an initial unexpanded state and an expanded state. It is desirable to have an outer diameter or outer cross-sectional area in the expanded state that is larger than the operating diameter or cross-sectional area of the well bore; however, this is not required. It is also desirable that the outer diameter or cross-sectional area of the tube member in its unexpanded state is less than the nominal operating diameter or cross-sectional area of the well bore. It is also desirable that at least part of the radial expansion of the tube member is sufficient to place the wellbore or any seals in compression; however, this is not required.

In addition to expansion of the tube member caused by the reactive expandable filler, additional expansion can also be obtained by one or more physical methods, processes or apparatus used to expand the diameter of a tube member; however, this is not required. There are various mechanisms that can be used to deform the tube member structure to larger expansions. For example, internal pressure can be applied to further expand the tube member to its final expanded diameter by increasing fluid pressure and/or by utilizing an expansion apparatus, such as a plug or mandrel. Since the material of the tube member is expanding in the plastic deformation region of the polymeric matrix of the composite material, expansion deformation is permanent. The tube member expands either through stored energy and/or by any other expansion system above the plastic yield point of the polymeric matrix of the composite material such that the expansion or other deformation is permanent upon removal of the deformation forces.

The smaller outer diameter or cross-sectional area of the tube member in the unexpanded state allows the tube member to pass through the inner diameter or cross-sectional area of an identical tube member in the expanded state, or through the inner diameter of a bore or pipe. The speed of expansion of the tube member can be designed such that the expansion reaction does not occur to a significant extent until the tube member is lowered to or otherwise placed in the position where it will be installed; however, this is not required. For long laterals and runs, a degradable or triggerable delay coating can be placed on the expandable tube member; however, this is not required. The coatings (when used) can be used to delay reaction or activation of the expandable filler for hours to days, or until specific temperatures or chemical exposure are reached.

The expandable tube members or casings described herein can be made of any suitable composite material. Non-limiting examples of polymers that can be used in the composite material include polyaramids, polyarylates, polyureas, polycarbonates, nylons, polyethers, polyolephins, polysulphones, some polyurethanes, and vinyl esters and other epoxys, among others. It is desirable to use a material that has significant yield and elastic properties. Elastomeric materials with low modulus are generally undesirable as matrix materials for expandable structures.

The expandable tube member or casing described herein can be used as a single section (or joint) or in a casing string (or assemblage of casing joints). The expandable tube member or casing described herein can also be used as a separate string of tubing or casing or as any part of a drilling assembly (or assemblage of numerous types of specialized drilling tube members and tools). The expandable tube members of the present invention can be used in conjunction with any conventional casing to form a lengthy pipe string. Alternatively, the expandable tube member or casing described herein can be used to stabilize only discrete problem areas of a well.

The strength requirements of the expandable tube member are dependent on the operating conditions and characteristics of a well. Accordingly, these strength requirements are not meant to be a limitation on the general invention. Rather, these strength requirements are preferences and are generally well above the physical properties of current swellable elastomers used in swellable packers and other downhole applications.

The expandable tube member generally should meet several strength characteristics in order to meet demands expected in oilfield environments. The tube member generally has a burst or collapse pressure sufficient to seal the leak or isolate the problematic area in a well or other region. The expandable tube member generally has axial load strength ratings sufficient to allow run-in.

The expandable tube member generally is designed to limit a decrease in axial length to less than about 3%, typically less than about 1%, and more typically about 0% (e.g., no change in axial length). In some applications, such as complying with geologic subsidence, the expandable tube member can be designed to increase in axial length during radial expansion; however, this is not required. For example, if a 30-foot section of unexpanded tube member is put in the borehole, it is generally desirable that the segment of the tube member be at least about 30 feet long after radial expansion of the tube member is complete. Control over axial expansion can be accomplished through the use of axial fibers, metal inserts, etc. that are included in the tube member; however, this is not required.

The above invention describes the governing physics and embodiments for the inventive in situ self-expandable tube members. In one specific non-limiting example, the expandable tube member is designed to achieve an expanded outer diameter of ten inches without external energy, such as internal pressure, being applied. In order for the assembly to be deployed into a well bore over a drillstring, the unexpanded tube member is designed to fit over a 6⅝" drillstring and through an existing casing with a 9⅝" inner diameter. Specifically, the unexpanded outer diameter of the tube member must be smaller than the expanded inner diameter of the existing casing and the inner diameter must be larger than the inner drill pipe maximum diameter. A radial gap of at least 0.125" between the outer diameter of the tube member (in the unexpanded state) and the inner diameter (in the expanded state) is desirable. This allows various fluids to be pumped through the annulus and reduces the chances of the expandable tube member becoming stuck during deployment. In one non-limiting embodiment, the expandable tube member can be about 30 feet long; however, other lengths can be used.

In addition to the dimensional requirements of the expandable tube member, the expanded tube member is also designed to have physical strength requirements in order to be suitable for use in the oilfield environments. The expandable tube member generally is able to withstand about 5,000 psi, generally above 2000 psi and typically above 5000-6000 psi of burst or collapse pressure without becoming damaged, plastically deforming, or initiating a leak path. The expandable tube member is typically designed to withstand internal and external pressures of at least 200 psi without deforming in cross-sectional area by more than 10%, and typically no more than 5%, and still more typically no more than 2%.

In another non-limiting embodiment, the expanded tube member can be used as a core mandrel supporting an expandable packer; however, this is not required. The expandable tube member can be coated or assembled with a swellable elastomer. The use of a coating on the tube member and/or the tube member assembled with a swellable elastomer in combination with the expandable tube member can result in the increase in the total expansion of the tube member. As such, a smaller diameter packer can be used, thus reducing problems with installation. Upon reaching installation depth, the expandable tube member can be expanded first, expanding the packer diameter, and then followed by swelling of the coated elastomer to create a seal between the outer surface of the expandable tube member and another structure (e.g., well bore, pipe casing, etc.). Significantly larger expansion ratios can be achieved or, by using the expandable tube member to constrain the expandable elastomer coating, smaller (shorter) packers with equivalent or higher pressure ratings can achieved.

Referring now to FIGS. 1-4, there is illustrated a tube member 100 that has a body 102 that is generally cylindrical shaped and is formed of an expandable composite material. The tube member includes an internal passageway or cavity 104 that generally has a circular cross-sectional shape; however, this is not required. The expandable composite material includes one or more polymer or plastic materials that forms a polymer matrix 120 and a plurality of expandable filler particles 130 dispersed in the polymer matrix. FIG. 1 illustrates the tube member in the unexpanded position and FIG. 3 illustrates the tube member in the expanded position. As illustrated in FIG. 1, the expandable filler particles have not been active, thus are in an unexpanded state. As illustrated in FIG. 4, the expandable filler particles have been activated and have expanded. The expansion of the expandable filler particles causes the polymer matrix to expand, thereby causing the outer diameter or outer cross-sectional area of the tube member to expand from D1 to D2, wherein D2 is greater than D1. The amount of expansion of the expandable filler will depend on the type of expandable filler and the amount of expandable filler present in the polymer matrix. The expandable filler is illustrated as being generally evenly dispersed in the polymer matrix so that the composite material is caused to generally evenly expand; however, it can be appreciated that the expandable filler can be concentrated in one or more regions of the polymer matrix so as to cause one or more portions of the composite material to expand at a different amount and/or rate from one or more other portions of the expandable composite material. The inner diameter or inner cross-sectional area of the internal passageway or cavity of the tube member may stay the same, decrease, or increase during the expansion of the tube member. Generally, the tube member is designed such that after expansion of the tube member, the inner diameter or inner cross-sectional area of the internal passageway or cavity of the tube member has the same or increased inner diameter or inner cross-sectional area. However, if the inner diameter or inner cross-sectional area of the internal passageway or cavity of the tube member decreases after expansion of the tube member, the percentage decrease is generally less than 15%, typically less than 10%, more typically less than 5%, and still more typically less than 2%. The thickness of the wall of the tube member generally increases after the composite material has expanded; however, this is not required. Generally, the outer diameter or outer cross-sectional area of the tube member is caused to increase by at least 1%, and typically by at least 5%. In addition to the expansion of the outer diameter or outer cross-sectional area of the tube member when the tube member is expanded, the length of the tube member can also be caused to increase or stay the same length during the expansion of the outer diameter or outer cross-sectional area of the tube member. Generally, the length of the tube increases by about 0-10% (and all values and ranges therebetween) during the expansion of the tube member.

Figure 12:
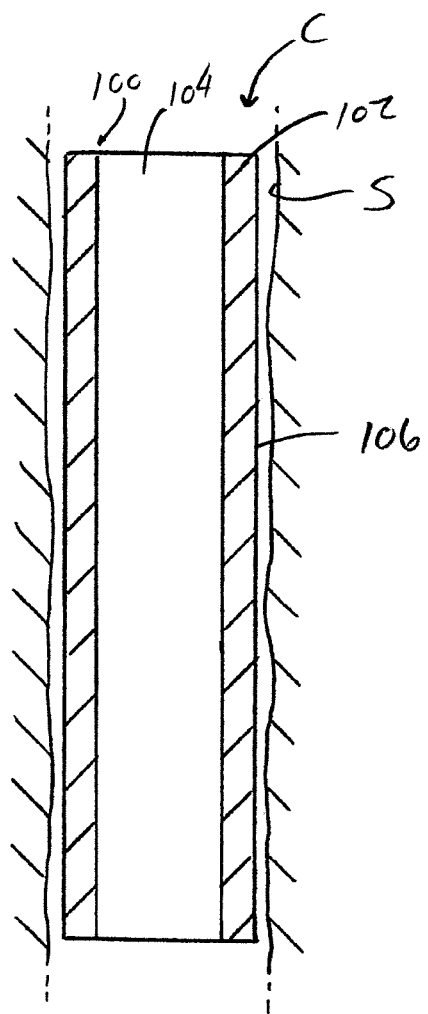
FIG. 12 illustrates a section of a tube member in a wellbore.
Figure 13:
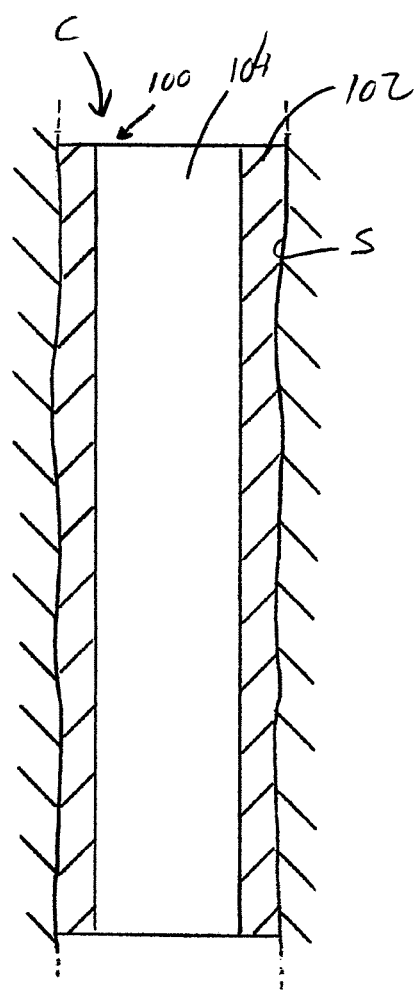
FIG. 13 illustrates the tube member of FIG. 12 after being expanded.

Referring now to FIGS. 12 and 13, there is illustrated a tube member 100 inserted into a cavity C such as a well bore. The tube member illustrated in FIG. 12 is in the unexpanded position and the outer surface 106 of body 102 of the tube member is spaced from the inner wall surface S of cavity C. Such spacing enables the tube member to be inserted into cavity C. The tube member illustrated in FIG. 13 is in the expanded position. The outer surface 106 is in contact with the inner wall surface S of cavity C and has partially or fully conformed to the profile of surface S. The contact of the outer surface of the body of the tube member with the inner wall surface of the cavity can be used to 1) form a partial or full liquid seal between the tube member and the inner wall surface of the cavity, 2) facilitate in centering the tube member in the cavity, 3) secure the tube member in position relative to the inner wall surface of the cavity, 4) limit or prevent the flow of fluid into fractures in the cavity, and/or 5) provide structural integrity to the cavity.

Figure 5A:
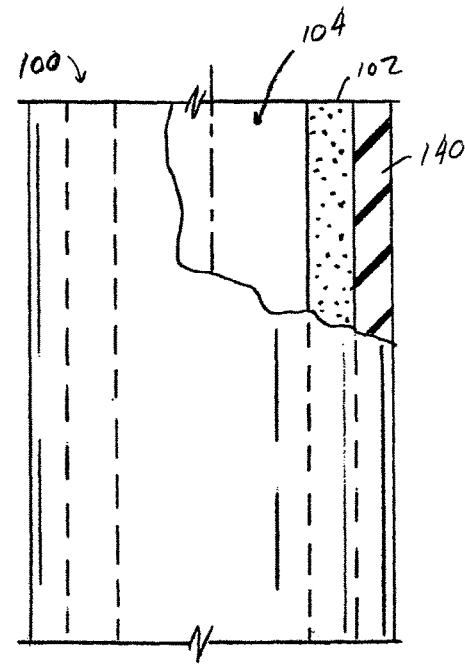
FIG. 5A illustrates the section of the tube member of FIG. 5 after being expanded.

Referring now to FIGS. 5, 5A, 14, 15, 16 and 17, there are illustrated optional configurations of the tube member. FIGS. 5 and 5A illustrate a tube member that is partially or fully coated with an outer coating 140 on the outer surface of the tube member. The outer coating 140 is generally a different composition from the composition of the composite material used to partially or fully form the body 102 of the tube member 100; however, it can be appreciated that the outer coating 140 can be the same composition as the composite material used to partially or fully form the body 102 of the tube member 100. The thickness of the outer coating is non-limiting. Generally, the thickness of the outer coating is the same or less than the thickness of the wall of the tube member. The thickness of the outer coating along the longitudinal length of the tube member can be uniform or non-uniform.

The outer coating can be fully coated on the complete outer surface of the tube member, or be coated in select regions of the outer surface of the tube member (e.g., spaced bands of outer coating material that are spaced vertically from one another, spaced bands of outer coating that are spaced apart from one another about the outer peripheral surface of the tube member, etc.), and/or be coated only at certain lengths of the tube member (e.g., outer coating only coated at the bottom few feet of the tube member, etc.).

The tube member that includes the outer coating can be formed of an expandable or non-expandable material. As illustrated in FIG. 5A, the tube member has been expanded such that the outer diameter or cross-sectional area is larger than the outer diameter or cross-sectional area of the tube member in FIG. 5. As illustrated in FIG. 5A, the body 102 of the tube member 100 is formed of an expandable composite material and the tube member can have the same or similar properties as the tube member described in FIGS. 1-4. The outer coating can be an expandable or non-expandable material. As illustrated in FIG. 5A, the outer coating is an expandable material. When the outer coating is an expandable material, the outer coating can be formulated to expand prior to, at the same time or after the expansion of the composite material in the body of the tube member. When the outer coating is expandable, the outer coating can be formulated to expand less than, more than, or the same as the amount of expansion of the body of the tube member. When the outer coating is not an expandable material, the outer coating is generally formed of a compressible and/or deformable material; however, this is not required. Non-limiting non-expandable materials that can be used as the outer coating include rubber, elastomers, etc. When the outer coating is an expandable material, the material can be an expandable composite material as described above with regard to the tube member, or can be some other type of expandable material (e.g., urethane material, expandable polymer, a block of expandable filler material, etc.).

The outer coating is designed to partially or fully conform to an exterior surface (e.g., well bore wall, another pipe, etc.) when the outer coating contacts such exterior surface (as exemplified in FIG. 13 when then tube member is in a well bore, etc.) due to 1) the expansion of the body of the tube member, 2) the expansion of the outer coating material, or 3) the expansion of both the body of the tube member and the outer coating material. The outer coating can also or alternatively be used to reduce friction as the tube member is inserted into a pipe or wellbore prior to expansion or prior to full expansion of the tube member.

When both the body of the tube member and the outer coating material are expandable, the rate of expansion can be the same or different. Also, when both the body of the tube member and the outer coating material are expandable, the amount of expansion can be the same or different. Also, when both the body of the tube member and the outer coating material are expandable, the means to activate can be the same or different (e.g., same or different activation temperature, same or different activation liquid or solution, the body is activated [e.g., temperature, etc.] by a different activator than the outer coating [e.g., liquid or solution, etc.]). Also, when both the body of the tube member and the outer coating material are expandable, the time of expansion can be the same or different (e.g., the body begins to expand prior to the time the outer coating material begins to expand, the outer coating material begins to expand prior to the time the body material begins to expand, etc.). All of these alternative configurations of the tube member and the system and method for expanding the tube member are contemplated and included in the present invention.

The contact of the outer coating with the inner wall surface of the wellbore, pipe, etc. can be used to 1) form a partial or full liquid seal between the tube member and the inner wall surface of the wellbore, pipe, etc., 2) facilitate in centering the tube member in the wellbore, pipe, etc., 3) secure the tube member in position relative to the inner wall surface of the wellbore, pipe, etc., 4) limit or prevent the flow of fluid into fractures in the cavity, and/or 5) provide structural integrity to the inner wall surface of the wellbore, pipe, etc.

Figure 14:
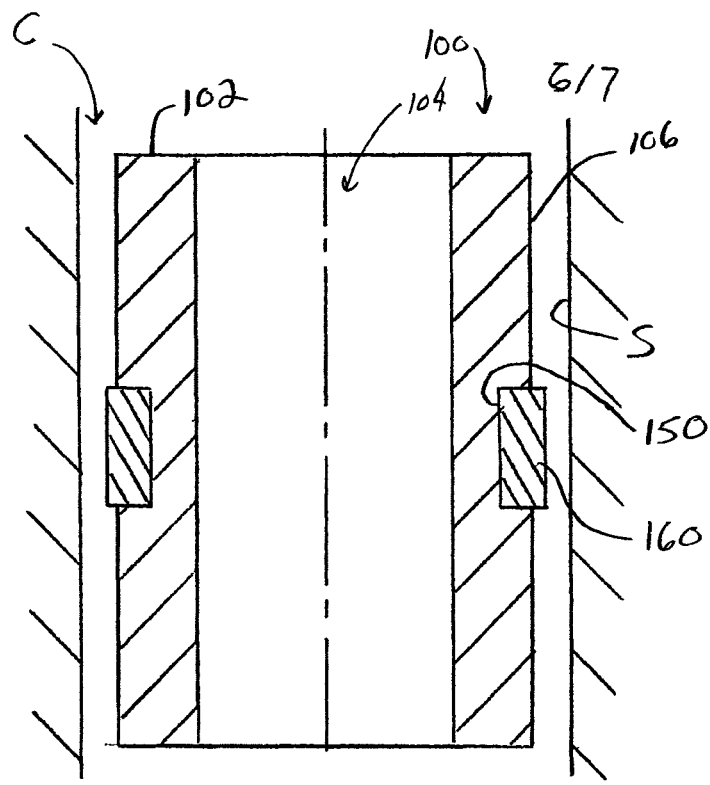
FIG. 14 illustrates a section of a tube member that includes a seal member in a wellbore.
Figure 15:
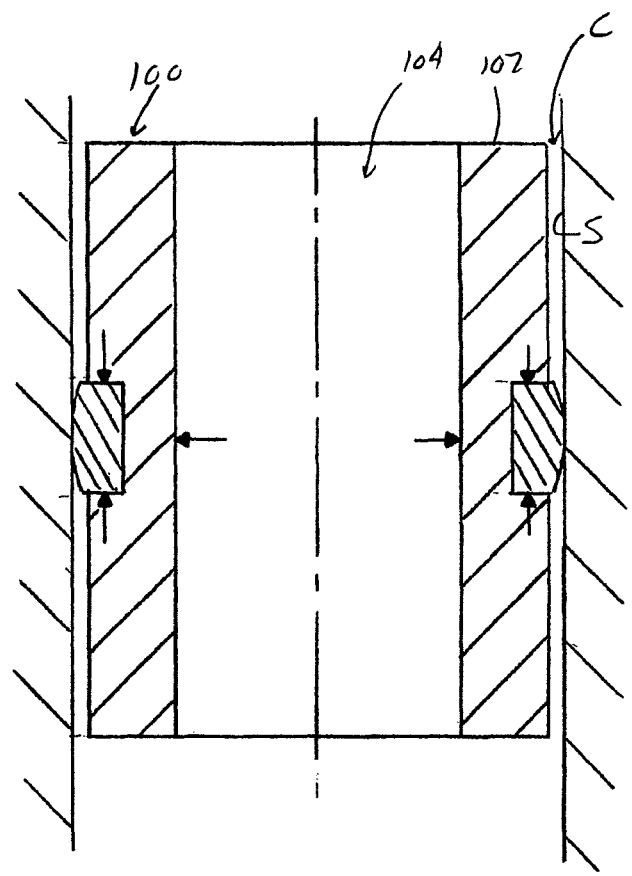
FIG. 15 illustrates the tube member of FIG. 14 after being expanded.

Referring now to FIGS. 14 and 15, there is illustrated a tube member 100 that is located in cavity C that is formed by a well bore, another pipe, etc. The outer surface 106 of the tube member is illustrated as being spaced from the inner wall surface S of the cavity. This spacing enables the tube member to be inserted into the cavity. The body 102 of the tube member may or may not be formed of an expandable material. The outer surface of the body of the tube includes a recess 150 that partially or fully contains a sealing member 160. The sealing member may or may not be an expandable material. Generally, the sealing member is formed of a different material form the body of the tube member; however, this is not required.

The sealing member is illustrated as extending outwardly from the outer surface of the tube member; however, it can be appreciated that the sealing member can be inserted in the recess such that it is flush with the outer surface of the tube member or recessed from the outer surface of the tube member. If the sealing member extends outwardly from the outer surface of the tube member, the outer diameter or cross-sectional area of the sealing member is generally less than the diameter or cross-sectional area of cavity C as illustrated in FIG. 14 so as to not interfere with the insertion of the tube member into the cavity prior to the expansion of the body of the tube member and/or expansion of the sealing member.

The cavity is configured to maintain the sealing member in a desired location on the tube member. As can be appreciated, additional or alternative means can be used to maintain the sealing member in a desired location on the tube member (e.g., adhered to the tube member by an adhesive, melted bond, friction fit, mechanical attachment [e.g., snap, rivet, nail, screw, bolt, hook and loop fastener, etc.], etc.).

Although the tube member illustrated in FIG. 14 only includes a single recess about the complete perimeter of the outer surface of the tube member, it will be appreciated that 1) the tube member can include multiple recess that are positioned partially or completely about the perimeter of the outer surface of the tube member and wherein each of the recesses includes a sealing member that is partially fully positioned in the recess, 2) the tube member can include a since recess that is positioned partially about the perimeter of the outer surface of the tube member and wherein the recess includes a sealing member that is partially fully positioned in the recess, and/or 3) the tube member can include one or more recess that are positioned vertically along the longitudinal length of the outer surface of the tube member, and the one the one or more recess extend partially or fully the longitudinal length of the tube member, and wherein each of the recesses includes a sealing member that is partially fully positioned in the recess.

Referring now to FIG. 15, the tube member is illustrated as being expanded. The body of the tube member is illustrated as having expanded, which has resulted in the outer diameter or cross-sectional area to increase thereby causing the outer surface of the body of the tube member to reduce the size of the spacing between the outer surface of the body of the tube member and the inner wall surface S of cavity C. Although FIG. 15 illustrates the outer surface of the body of the tube member still being spaced from the inner wall surface S of cavity C, it can be appreciated that the outer surface of the body of the tube member can contact the inner wall surface S of cavity C after being expanded. The internal passageway or cavity 104 of the tube member is also illustrated in FIG. 15 as increasing in diameter or cross-sectional area due to the expansion of the body of the tube member; however, it can be appreciated that the diameter or cross-sectional area of the internal passageway or cavity 104 of the tube member can remain the same or slightly decrease due to the expansion of the body of the tube member.

In addition to the outer diameter or cross-sectional area increasing due to the expansion of the body of the tube member, the expansion of the tube member can also cause the size of the recess 150 to decrease, thereby causing the sealing member to be compressed as illustrated by the arrows in FIG. 15. The compression of the sealing member can result in the sealing member extending outwardly or further outwardly from the outer surface of the body and to contact the inner wall surface S of cavity C. The contact of the sealing member with the inner wall surface S of cavity C can be used to 1) form a partial or full liquid seal between the body of the tube member and cavity C, 2) facilitate in centering the tube member in cavity C, 3) secure the tube member in position relative to cavity C, 4) limit or prevent the flow of fluid into fractures in the cavity, and/or 5) provide structural integrity to the cavity.

When the sealing member is not an expandable material, the sealing member is generally formed of a compressible and/or deformable material; however, this is not required. Non-limiting non-expandable materials that can be used for the sealing member include rubber, elastomers, etc. When the sealing member is an expandable material, the material can be an expandable composite material as described above with regard to the tube member, or can be some other type of expandable material (e.g., urethane material, expandable polymer, a block of expandable filler material, etc.). In one non-limiting embodiment, the sealing member is an elastomeric component that is formed of or includes a swellable rubber.

Figure 16:
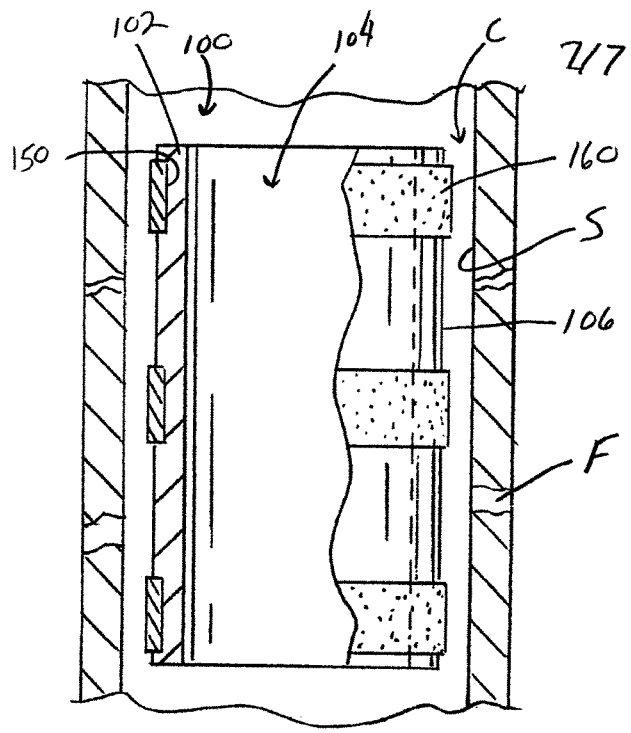
FIG. 16 illustrates a section of a tube member that includes multiple seal members in a wellbore; and, FIG. 17 illustrates the tube member of FIG. 16 after being expanded.
Figure 17:
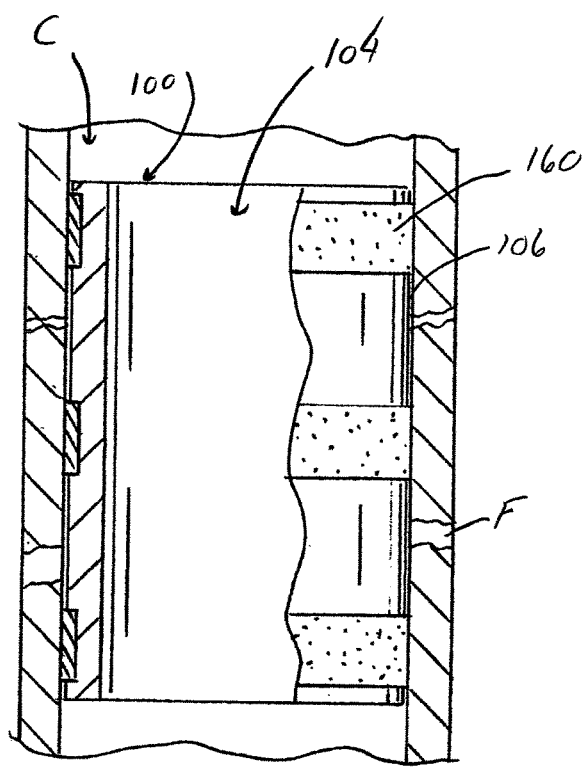

Referring now to FIGS. 16 and 17, there is illustrated a tube member 100 that is located in cavity C that is formed by a well bore, another pipe, etc. The outer surface 106 of the tube member is illustrated as being spaced from the inner wall surface S of the cavity. This spacing enables the tube member to be inserted into the cavity. The body 102 of the tube member may or may not be formed of an expandable material. The outer surface of the body of the tube includes a recess 150 that partially or fully contains a sealing member 160. The sealing member may or may not be an expandable material. Generally, the sealing member is formed of a different material form the body of the tube member; however, this is not required.

The cavity is configured to maintain the sealing member in a desired location on the tube member. As can be appreciated, additional or alternative means can be used to maintain the sealing member in a desired location on the tube member (e.g., adhered to the tube member by an adhesive, melted bond, friction fit, mechanical attachment [e.g., snap, rivet, nail, screw, bolt, hook and loop fastener, etc.], etc.).

The sealing member is illustrated as extending outwardly from the outer surface of the tube member; however, it can be appreciated that the sealing member can be inserted in the recess such that it is flush with the outer surface of the tube member or recessed from the outer surface of the tube member. If the sealing member extends outwardly from the outer surface of the tube member, the outer diameter or cross-sectional area of the sealing member is generally less than the diameter or cross-sectional area of cavity C as illustrated in FIG. 16 so as to not interfere with the insertion of the tube member into the cavity prior to the expansion of the body of the tube member and/or expansion of the sealing member.

The tube member is illustrated as including three recesses about the complete perimeter of the outer surface of the tube member; however, it will be appreciated that the tube member can include only two recesses or more than three recess that are positioned completely about the perimeter of the outer surface of the tube member and wherein each of the recesses includes a sealing member that is partially fully positioned in the recess.

Referring now to FIG. 17, the tube member is illustrated as being expanded. The body of the tube member is illustrated as having expanded, which has resulted in the outer diameter or cross-sectional area to increase thereby causing the outer surface of the body of the tube member to reduce the size of the spacing between the outer surface of the body of the tube member and the inner wall surface S of cavity C. Although FIG. 17 illustrates the outer surface of the body of the tube member still being spaced from the inner wall surface S of cavity C, it can be appreciated that the outer surface of the body of the tube member can contact the inner wall surface S of cavity C after being expanded. The internal passageway or cavity 104 of the tube member is also illustrated in FIG. 17 as increasing in diameter or cross-sectional area due to the expansion of the body of the tube member; however, it can be appreciated that the diameter or cross-sectional area of the internal passageway or cavity 104 of the tube member can remain the same or slightly decrease due to the expansion of the body of the tube member.

In addition to the outer diameter or cross-sectional area increasing due to the expansion of the body of the tube member, the expansion of the tube member can also cause the size of the recess 150 to decrease, thereby causing the sealing member to be compressed. The compression of the sealing member can result in the sealing member extending outwardly or further outwardly from the outer surface of the body and to contact the inner wall surface S of cavity C. Also, or alternatively, the sealing member can be formed of an expandable material that can be activated to cause the sealing member to expand and facilitate in the contact of the sealing member with the inner wall surface S of cavity C. The contact of the sealing member with the inner wall surface S of cavity C can be used to 1) form a partial or full liquid seal between the body of the tube member and cavity C, 2) facilitate in centering the tube member in cavity C, 3) secure the tube member in position relative to cavity C, 4) limit or prevent the flow of fluid into fractures in the cavity, and/or 5) provide structural integrity to the cavity.

The cavity C illustrated in FIGS. 16 and 17 includes fractures F in the side wall of the cavity. These fractures can allow water, brine, well drilling solutions, etc. to escape the well bore. The tube member illustrated in FIGS. 16 and 17 is configured to seal off these fractures in the well bore and thereby limit or prevent fluid from flowing into the fractures from the well bore once the tube member is positioned in place about the fractures and expanded as illustrated in FIG. 17.

When the sealing member is not an expandable material, the sealing member is generally formed of a compressible and/or deformable material; however, this is not required. Non-limiting non-expandable materials that can be used for the sealing member include rubber, elastomers, etc. When the sealing member is an expandable material, the material can be an expandable composite material as described above with regard to the tube member, or can be some other type of expandable material (e.g., urethane material, expandable polymer, a block of expandable filler material, etc.). In one non-limiting embodiment, the sealing member is an elastomeric component that is formed of or includes a swellable rubber.

Figure 8:
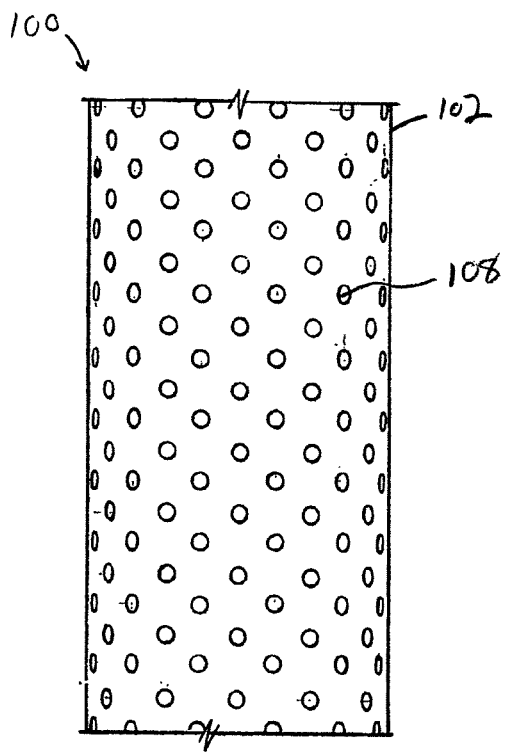
FIG. 8 illustrates a section of a tube member that includes a plurality of holes or openings in the tube member.
Figure 9:
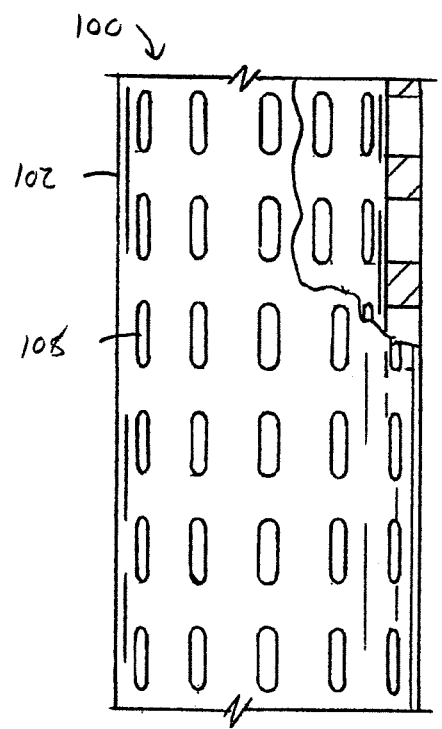
FIG. 9 illustrates a section of a tube member that includes a plurality of slots or openings in the tube member.
Figure 8A:
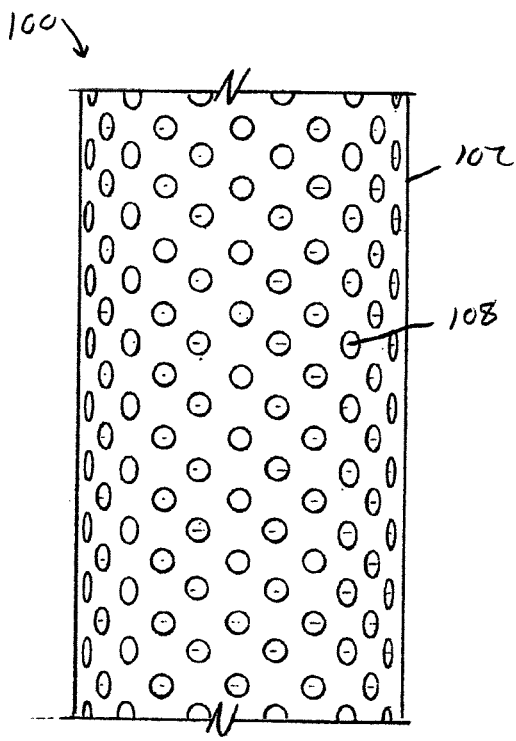
FIG. 8A illustrates the tube member of FIG. 8 after being expanded.
Figure 9A:
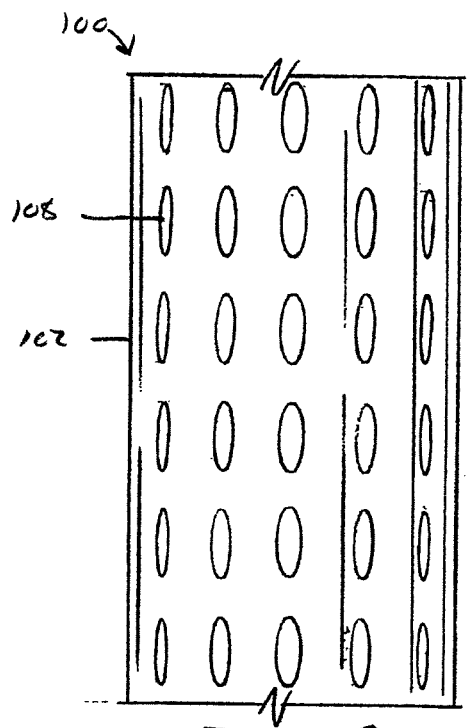
FIG. 9A illustrates the tube member of FIG. 9 after being expanded.

Referring now to FIGS. 8, 8A, 9 and 9A, the body 102 of the tube member 110 can include one or more preformed openings or slots 108. The number of openings or slots on the body, the location and/or pattern of the one or more openings or slots on the body, and the shape and/or size of the one or more openings or slots on the body is non-limiting. The openings or slots can be used to 1) facilitate in the expansion of the body of the tube member, and/or 2) allow fluid flow through the openings or slots. FIG. 8 illustrates a body of a tube member that includes a plurality of openings having a generally circular cross-sectional shape. FIG. 8A illustrates the tube member in an expanded state whereby the openings illustrated in FIG. 8 have increased in cross-sectional area due to the expansion of the body of the tube member. FIG. 9 illustrates a body of a tube member that includes a plurality of openings having a generally oval or slot-shape cross-sectional shape. FIG. 9A illustrates the tube member in an expanded state whereby the openings illustrated in FIG. 9 have increased in cross-sectional area due to the expansion of the body of the tube member.

Figure 6:
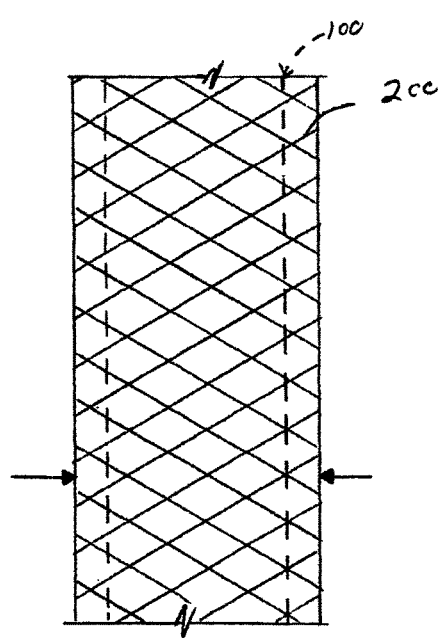
FIG. 6. illustrates a section of a tube member that includes a constraining member about the outer surface of the tube member.
Figure 7:
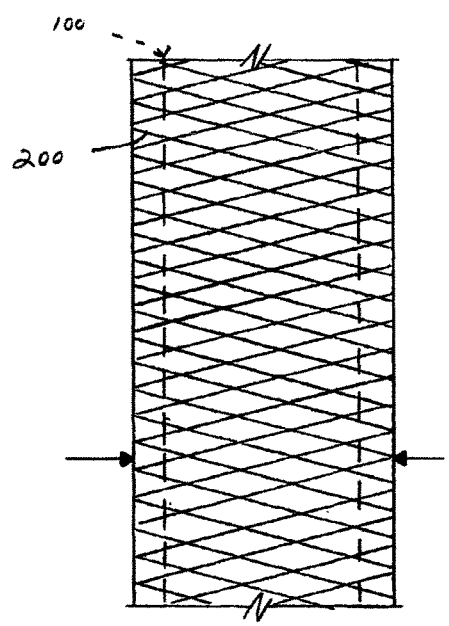
FIG. 7 illustrates the tube member and constraining member of FIG. 7 after being expanded.

Referring now to FIGS. 6 and 7, there is illustrated a reinforcement structure or material 200 that is positioned about the outer surface of the tube member. The composition and configuration of the reinforcement structure is non-limiting. As illustrated in FIGS. 6 and 7, the reinforcement structure is in the form of a mesh; however, many of configurations can be used (e.g., a ribbon of reinforcement structure wrapped about the tube member, reinforcing fibers, reinforcing flakes, reinforcing ribs, reinforcing filler, and other internal structures etc.). The reinforcement structure can be formed of or include metal materials (e.g., stainless steel, titanium, nickel, iron alloys, etc.), synthetic fibers (e.g., Kevlar™, Twaron™, Innegra S™, etc.), carbon fibers, and/or glass fibers, etc. The reinforcement structure can be located on discrete regions of the tube member or be positioned about the complete longitudinal length of the tube member. The reinforcement structure is designed to 1) increase the hoop and collapse strength of the tube member, 2) constrain axial expansion of the tube member, 3) control the amount of maximum axial expansion of the tube member, 4) control the amount of liner expansion of the tube member, and/or 5) increase burst and/or buckling limits of the tube member.

As illustrated in FIG. 6, the tube member in the unexpanded state and the reinforcement structure about the tube member constrain the expansion of the tube member as illustrated by the arrows. As illustrated in FIG. 7, the tube member is in the expanded state and the shape of the reinforcement structure has changed due to such expansion of the tube member. The configuration of the reinforcement structure can be selected to enable the reinforcement structure to allow limited expansion of the tube member, thereby controlling the maximum amount of axial expansion of the tube member. The arrows in FIG. 7 illustrate the constraining force being applied by the reinforcement structure on the tube member to limit the axial expansion of the tube member. The reinforcement structure, by limiting the maximum amount of axial expansion of the tube member, can optionally control the amount of linear expansion of the tube member during the expansion of the tube member. As such, the reinforcement structure can optionally be used to ensure that the tube member maintains its longitudinal length during expansion, or can cause the tube member to increase in longitudinal length during expansion. As can be appreciated, the use of the reinforcement structure can be used with any of the tube members described and illustrated in FIGS. 1-5A and 8-17.

Figure 10:
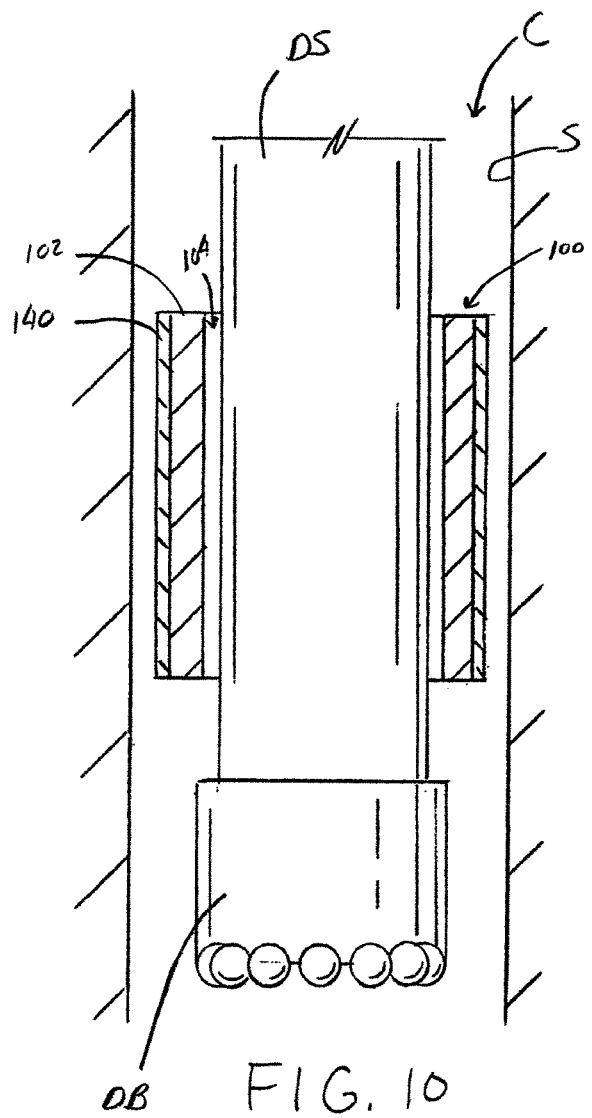
FIG. 10 illustrates a tube member positioned about a portion of a drillstring positioned above the drillbit as the drillstring is positioned in a wellbore.
Figure 11:
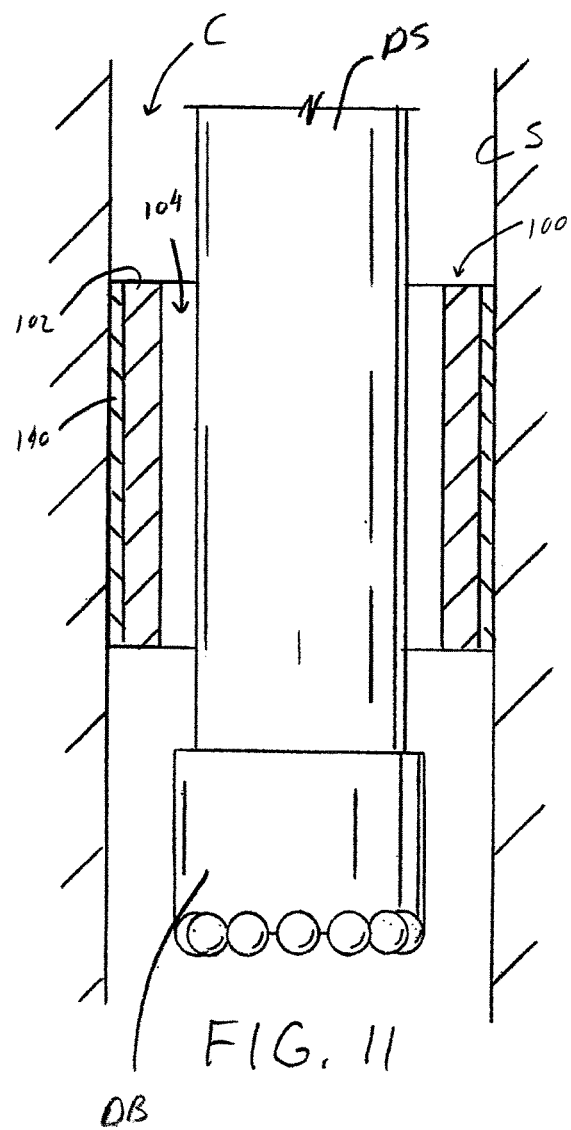
FIG. 11 illustrates the tube member of FIG. 10 after being expanded.

Referring now to FIGS. 10 and 11, a non-limiting application of the tube member in accordance with the present invention is illustrated. A drillstring DS having a drillbit DB positioned at the end of the drillstring is illustrated as being positioned in a cavity C of a wellbore. As illustrated in FIG. 10, a tube member 100 is positioned about the drillstring and positioned above the drillbit. The tube member is illustrated as including a body member 102 and an outer coating 140 on the outer surface of the body. As can be appreciated, the tube member can be any of the tube members described and illustrated in FIGS. 1-9 and 12-17. The tube member is illustrated as having a longitudinal length that only encircles a portion of the drillstring; however, it can be appreciated that that tube member can have a longitudinal length that results in the tube member encircling up to 100% of the longitudinal length of the drillstring (e.g., 0.0001-100% and all values and ranges therebetween). The tube member is illustrated as being spaced from the top end of the drillbit; however, this is not required. In one non-limited embodiment, the tube member can be designed to be connected to the drillstring as the drillstring is moved downward into the wellbore; however, this is not required. In another non-limiting embodiment, the drillstring and drillbit are moved downwardly into a wellbore to the location that where tube member of the present invention is to be inserted. Thereafter, the tube member is positioned about the drillstring and the tube member is caused to be moved downwardly along the drillstring until the tube member reaches its desired location in the wellbore. As can be appreciated, other methods can be used to cause the tube member to be positioned in the wellbore at a desired location.

As illustrated in FIG. 10, the internal passageway or cavity 104 of the tube member has a diameter or cross-sectional area that is greater than the diameter or cross-sectional area of the drillstring to create a space between the inner surface of the internal passageway or cavity 104 of the tube member and the outer surface of the drillstring; however, this is not required. Such spacing enables the tube member to be moved along the longitudinal length of the drillstring. As also illustrated in FIG. 10, the diameter or cross-sectional area of the internal passageway or cavity 104 of the tube member is less than the diameter or cross-sectional area of the drillbit; however, this is not required. Such a configuration of the tube member would prevent the tube member from moving down the drillstring and beyond the end of the drillbit when the tube member is in the unexpanded state.

Prior to, during and/or after the tube member is positioned in a desired location in the wellbore, the tube member can be activated to cause the tube member to expand. If the tube member is activated prior to or during the movement of the tube member to the desired location in the wellbore, the tube member should be designed and configured so that the tube member does not reach full expansion prior to the tube member being positioned in the desired location in the wellbore. The activation of the tube member can be accomplished by one or more means (e.g., a) change in temperature about the expandable tube member and/or the expandable filler from the surface of a ground cavity to a particular location in said ground cavity, b) exposure of the expandable tube member and/or the expandable filler to a certain temperature or temperature range, c) change in pH about the expandable tube member and/or the expandable filler, d) exposure of the expandable tube member and/or the expandable filler to a certain pH or pH range, e) change in salinity about the expandable tube member and/or the expandable filler, f) exposure of the expandable tube member and/or the expandable filler to a certain salinity or salinity range, g) exposure of the expandable tube member and/or the expandable filler to an activation element or compound, h) change in pressure about the expandable tube member and/or the expandable filler from the surface of a ground cavity to a particular location in said ground cavity, i) exposure of the expandable tube member and/or the expandable filler to a certain pressure or pressure range, j) electrical stimulation of the expandable tube member and/or the expandable filler, k) exposure of the expandable tube member and/or the expandable filler to a certain sound frequency, and/or l) exposure of the expandable tube member and/or the expandable filler to a certain electromagnetic frequency). A degradable or triggerable delay coating can optionally be placed on the tube member to delay reaction or activation of the expandable filler in the tube member to facilitate in ensuring that the tube member does not fully expand prior to the tube member being positioned in the desired location in the wellbore.

Once the tube member is positioned in the desired location in the wellbore, the tube member is maintained in such position until the tube member has sufficiently expanded until one or more portions of the outer surface of the tube member has contacted the interior surface of another pipe or tube or, as illustrated in FIG. 11, the inner wall surface S of the cavity C of the wellbore and to thereby maintain the tube member in its desired position.

As illustrated in FIG. 11, the body of the tube member is formed of an expandable material such as an expandable composite material (e.g., polymer matrix that includes expandable filler particles, etc.). As illustrated in FIG. 11, the thickness of the wall of the body of the tube member has increased due to the expansion of the tube member. Also, the diameter or cross-sectional area of the internal passageway or cavity 104 of the tube member has increased such that it is now greater than the diameter or cross-sectional area of the drillbit. As such, the drillbit can now be withdrawn through the expanded tube member or continue downward into the wellbore and/or to drill further into the ground. As can be appreciated, the tube member can be configured to have a diameter or cross-sectional area of the internal passageway or cavity 104 of the tube member that is greater than the diameter or cross-sectional area of the drillbit prior to and after the expansion of the tube member.

The outer coating 140 is illustrated in FIG. 11 as also having an increased thickness due to the expansion of the tube member. The outer coating can be caused to begin to expand prior to, during or after the expansion of the body of the tube member has begun or is completed. In one non-limiting arrangement, the outer coating is caused to begin to expand after the body of the tube member has begun to expand. In another non-limiting arrangement, the outer coating is caused to begin to expand after the body of the tube member has achieved 80-100% of full expansion. As can be appreciated, the outer coating can be formed of a non-expandable material.

Once the tube member is fully expanded, the tube member can 1) form a partial or full liquid seal between the tube member and the inner wall surface of the wellbore, pipe, etc., 2) facilitate in centering the tube member in the wellbore, pipe, etc., 3) secure the tube member in position relative to the inner wall surface of the wellbore, pipe, etc., 4) limit or prevent the flow of fluid into fractures in the cavity, and/or 5) provide structural integrity to the inner wall surface of the wellbore, pipe, etc. As such, the tube member of the present invention can be used for many different functions such as a 1) liner, 2) screen, 3) pipe section, 4) plug, 5) patch, 6) packer, 7) device to control lost circulation or fluid inflow during drilling operations, 8) device to repair or seal a leak, 9) device to enhance fluid flow, 10) device to provide sand screening, 11) device to repair damaged pipes, casings, or liners, and/or 12) device to stabilize a wellbore.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall there between. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

What is claimed:

1. An expandable tube member for use in geologic structures, said expandable tube member can be used as a 1) liner, 2) screen, 3) pipe section, 4) plug, 5) patch, 6) packer, 7) device to control lost circulation or fluid inflow during drilling operations, 8) device to repair or seal a leak, 9) device to enhance fluid flow, 10) device to provide sand screening, 11) device to repair damaged pipes, casings, or liners, and/or 12) device to stabilize a wellbore, said expandable tube member is formed of a body having an outer surface and an internal cavity that extends a complete longitudinal length of said tube member, said body at least partially formed of an expandable composite material, said expandable composite material includes a polymer matrix and a plurality of expandable filler particles in said polymer matrix, said polymer matrix includes one or more compounds selected from the group consisting of polyaramids, nylon/polyarylates, polycarbonates, polysulfones, polyureas, polyesters, epoxys, polypropylene, and polyethylene, said expandable filler includes one or more materials selected from the group consisting of magnesium oxide, calcium oxide, lithium oxide, borate, selenium, iron, magnesium, manganese, germanium, calcium, aluminum, sodium, lithium, zinc, water-swellable clay, $CO_2$-swellable clay, water-swellable phosphate, $CO_2$-swellable phosphate, water-swellable carbide, $CO_2$-swellable carbide, water-swellable silicate, $CO_2$-swellable silicate, water-swellable borate, $CO_2$-swellable borate, water-swellable sulfate material, and $CO_2$-swellable sulfate material, said expandable filler constitutes 10-80 vol. % of said expandable composite material, said expandable composite material is formulated to expand when said expandable filler particles are partially or fully activated by one or more activation mechanisms selected from the group consisting of a) change in temperature about said expandable tube member and/or said expandable filler from the surface of a ground cavity to a particular location in said ground cavity, b) exposure of said expandable tube member and/or said expandable filler to a certain temperature or temperature range, c) change in pH about said expandable tube member and/or said expandable filler, d) exposure of said expandable tube member and/or said expandable filler to a certain pH or pH range, e) change in salinity about said expandable tube member and/or said expandable filler, f) exposure of said expandable tube member and/or said expandable filler to a certain salinity or salinity range, g) exposure of said expandable tube member and/or said expandable filler to an activation element or compound, h) change in pressure about said expandable tube member and/or said expandable filler from the surface of a ground cavity to a particular location in said ground cavity, i) exposure of said expandable tube member and/or said expandable filler to a certain pressure or pressure range, j) electrical stimulation of said expandable tube member and/or said expandable filler, k) exposure of said expandable tube member and/or said expandable filler to a certain sound frequency, and l) exposure of said expandable tube member and/or said expandable filler to a certain electromagnetic frequency.

2. The expandable tube member as defined in claim 1, wherein said activation of said expandable filler is partially or fully activated by one or more activation mechanisms selected from the group consisting of a) a change in temperature about said expandable tube member and/or said expandable filler from the surface of a ground cavity to a particular location in said ground cavity, b) exposure of said expandable tube member and/or said expandable filler to a certain temperature or temperature range, c) a change in pH about said expandable tube member and/or said expandable filler, d) exposure of said expandable tube member and/or said expandable filler to a certain pH or pH range, e) change in salinity about said expandable tube member and/or said expandable filler, f) exposure of said expandable tube member and/or said expandable filler to a certain salinity or salinity range, g) exposure of said expandable tube member and/or said expandable filler to an activation element or compound, said activation element or compound including one or more components selected from the group consisting of water and $CO_2$, h) change in pressure about said expandable tube member and/or said expandable filler from the surface of a ground cavity to a particular location in said ground cavity, and i) exposure of said expandable tube member and/or said expandable filler to a certain pressure or pressure range.

3. The expandable tube member as defined in claim 1, wherein said activation mechanism causing said expandable filler to have one or more reactions is selected from the group consisting of a hydrolization reaction, a carbonation reaction, and an oxidation reaction, or combination thereof.

4. The expandable tube member as defined in claim 2, wherein said activation mechanism causing said expandable filler to have one or more reactions is selected from the group consisting of a hydrolization reaction, a carbonation reaction, and an oxidation reaction, or combination thereof.

5. The expandable tube member as defined in claim 1, wherein said expandable composite material is partially or fully formed of a thermoplastic or thermosetting polymer matrix and a plurality of expandable filler particles that are reactive to one or more components selected from the group consisting of water and $CO_2$.

6. The expandable tube member as defined in claim 4, wherein said expandable composite material is partially or fully formed of a thermoplastic or thermosetting polymer matrix and a plurality of expandable filler particles that are reactive to one or more components selected from the group consisting of water and $CO_2$.

7. The expandable tube member as defined in claim 1, wherein said expandable filler includes one or more metals is selected from the group consisting of magnesium, calcium, lithium, boron, selenium, iron, manganese, germanium, aluminum, sodium, and zinc.

8. The expandable tube member as defined in claim 6, wherein said expandable filler includes one or more metals is selected from the group consisting of magnesium, calcium, lithium, boron, selenium, iron, manganese, germanium, aluminum, sodium, and zinc.

9. The expandable tube member as defined in claim 1, wherein said expandable tube member further includes a reinforcement structure, said reinforcement structure includes one or more materials selected from the group consisting of reinforcing fibers, flakes, ribbons, ribs, and mesh.

10. The expandable tube member as defined in claim 8, wherein said expandable tube member further includes a reinforcement structure, said reinforcement structure includes one or more materials selected from the group consisting of reinforcing fibers, flakes, ribbons, ribs, and mesh.

11. The expandable tube member as defined in claim 9, wherein said reinforcement structure is configured to perform at least one or more functions selected from the group consisting of a) increase hoop and collapse strength of said expandable tube member, b) constrain axial expansion of said expandable tube member, e) control an amount of maximum axial expansion of said expandable tube member, d) control an amount of liner expansion of said expandable tube member, and e) increase burst and/or buckling limits of said expandable tube member.

12. The expandable tube member as defined in claim 1, wherein said expandable tube member further includes an outer coating that at least partially covers said outer surface of said body, said outer coating selected from the group of materials consisting of an expandable material and a non-expandable material, said outer coating configured to perform at least one or more functions selected from the group consisting of a) partially or fully conforming to an exterior surface of a wellbore wall or pipe during or after expansion of said expandable tube member, b) reducing friction as said expandable tube member is inserted into a pipe or wellbore prior to expansion or prior to full expansion of said expandable tube member, c) forming a partial or full liquid seal between said outer coating and the inner wall surface of the wellbore or a pipe during or after expansion of said expandable tube member, d) facilitating in centering said expandable tube member in the wellbore or a pipe during or after expansion of said expandable tube member, e) securing said expandable tube member in position relative to the inner wall surface of the wellbore or a pipe during or after expansion of said expandable tube member, f) limiting or preventing a flow of fluid into fractures in a wall cavity of a wellbore or damaged pipe during or after expansion of said expandable tube member, g) providing structural integrity to an inner wall surface of the wellbore or a pipe during or after expansion of said expandable tube member, and h) controlling a speed and/or a time of activation of said expandable filler particles.

13. The expandable tube member as defined in claim 1, wherein said expandable tube member further includes an outer coating that at least partially covers said outer surface of said body, said outer coating selected from the group of materials consisting of an expandable material and a non-expandable material, said outer coating configured to perform at least one or more functions selected from the group consisting of a) partially or fully conforming to an exterior surface of a wellbore wall or pipe during or after expansion of said expandable tube member, b) reducing friction as said expandable tube member is inserted into a pipe or wellbore prior to expansion or prior to full expansion of said expandable tube member, c) forming a partial or full liquid seal between said outer coating and the inner wall surface of the wellbore or a pipe during or after expansion of said expandable tube member, d) facilitating in centering said expandable tube member in the wellbore or a pipe during or after expansion of said expandable tube member, e) securing said expandable tube member in position relative to the inner wall surface of the wellbore or a pipe during or after expansion of said expandable tube member, f) limiting or preventing a flow of fluid into fractures in a wall cavity of a wellbore or damaged pipe during or after expansion of said expandable tube member, g) providing structural integrity to an inner wall surface of the wellbore or a pipe during or after expansion of said expandable tube member, and h) controlling a speed and/or a time of activation of said expandable filler particles.

14. The expandable tube member as defined in claim 12, wherein said outer coating is formed of a degradable material, said outer coating configured to delay or prevent activation of said expandable filler particles until said outer coating becomes partially or fully degraded.

15. The expandable tube member as defined in claim 1, wherein said expandable tube member further includes a sealing member on said outer surface of said body, said sealing member selected from the group of materials consisting of an expandable material and a non-expandable material, said sealing member configured to perform at least one or more functions selected from the group consisting of a) partially or fully conforming to an exterior surface of a wellbore wall or pipe during or after expansion of said expandable tube member, b) reducing friction as said expandable tube member is inserted into a pipe or wellbore prior to expansion or prior to full expansion of said expandable tube member, c) forming a partial or full liquid seal between said sealing member and the inner wall surface of the wellbore or a pipe during or after expansion of said expandable tube member, d) facilitating in centering said expandable tube member in the wellbore or a pipe during or after expansion of said expandable tube member, e) securing said expandable tube member in position relative to the inner wall surface of the wellbore or a pipe during or after expansion of said expandable tube member; f) limiting or preventing a flow of fluid into fractures in a wall cavity of a wellbore or damaged pipe during or after expansion of said expandable tube member, and g) providing structural integrity to an inner wall surface of the wellbore or a pipe during or after expansion of said expandable tube member.

16. The expandable tube member as defined in claim 1, wherein said expandable tube member further includes a sealing member on said outer surface of said body, said sealing member selected from the group of materials consisting of an expandable material and a non-expandable material, said sealing member configured to perform at least one or more functions selected from the group consisting of a) partially or fully conforming to an exterior surface of a wellbore wall or pipe during or after expansion of said expandable tube member, b) reducing friction as said expandable tube member is inserted into a pipe or wellbore prior to expansion or prior to full expansion of said expandable tube member, c) forming a partial or full liquid seal between said sealing member and the inner wall surface of the wellbore or a pipe during or after expansion of said expandable tube member, d) facilitating in centering said expandable tube member in the wellbore or a pipe during or after expansion of said expandable tube member, e) securing said expandable tube member in position relative to the inner wall surface of the wellbore or a pipe during or after expansion of said expandable tube member, f) limiting or preventing a flow of fluid into fractures in a wall cavity of a wellbore or damaged pipe during or after expansion of said expandable tube member, and g) providing structural integrity to an inner wall surface of the wellbore or a pipe during or after expansion of said expandable tube member.

17. The method as defined in claim 15, wherein said sealing member is at least partially connected to said body by one or more arrangements selected from the group consisting of a groove in said outer surface of said body, a slot in said outer surface of said body, an adhesive, a melted bond, a friction fit arrangement, and a mechanical attachment arrangement.

18. An expandable tube member for e in a geologic structure, said expandable tube member configured to be used as 1) a patch, 2) a device to control lost circulation or fluid inflow during drilling operations, 3) a device to repair or seal a leak, 4) a device to repair damaged pipes, casings, or liners, and/or 5) a device to stabilize a wellbore, said expandable tube member formed of a body having an outer surface and an internal cavity extending a complete longitudinal length of said tube member, said body fully formed of an expandable composite material, said expandable composite material including a polymer matrix and a plurality of expandable filler particles dispersed in said polymer matrix, said polymer matrix including polyaramids, said expandable filler includes magnesium, said expandable filler having a particle size of 106 μm to 10 mm, said expandable filler constituting 10-80 vol. % of said expandable composite material, said expandable composite material formulated to expand when said expandable filler particles are exposed to liquid fluid in the geologic structure.

19. The expandable tube member as defined in claim 18, wherein an outer surface of said expandable tube member includes a dissolvable polymer coating, said dissolvable polymer coating inhibiting the liquid fluid from contacting said expandable filler particles in said expandable composite material until said dissolvable polymer coating is at least partially dissolved by the liquid fluid, said dissolvable polymer coating having a thickness of 0.1 μm to 1 mm, said dissolvable polymer coating including one or more materials selected from the group consisting of polyester, polyether, polyamine, polyamide, polyacetal, polyvinyl, polyureathane, epoxy, polysiloxane, polycarbosilane, polysilane, and polysulfone.

20. The expandable tube member as defined in claim 18, wherein said expandable composite material includes a catalyst, said catalyst including e one or more materials selected from the group consisting of peroxide and metal chloride, said catalyst in said expandable composite material having a weight percent of 0.001-10 wt. %.

21. The expandable tube member as defined in claim 19, wherein said expandable composite material includes a catalyst, said catalyst including one or more materials selected from the group consisting of peroxide and metal chloride, said catalyst in said expandable composite material having a weight percent of 0.001-10 wt. %.

22. The expandable tube member as defined in claim 19, wherein said expandable composite material includes a tiller material, said filler material including one or more materials selected from the group consisting of fumed silica, silica, glass fibers, carbon fibers, carbon nanotubes and finely divided inorganic material, said filler material in said expandable composite material having a weight percent of 1-60 wt. %.

23. The expandable tube member as defined in claim 19, wherein said expandable composite material includes a filler material, said filler material includes one or more materials selected from the group consisting of fumed silica, silica, glass fibers, carbon fibers, carbon nanotubes and finely divided inorganic material, said filler material in said expandable composite material having a weight percent of 1-60 wt. %.

24. The expandable tube member as defined in claim 9, wherein said reinforcement structure is configured to perform at least one or more functions selected from the group consisting of a) increase hoop and collapse strength of said expandable tube member, b) constrain axial expansion of said expandable tube member, c) control an amount of maximum axial expansion of said expandable tube member, d) control an amount of liner expansion of said expandable tube member, and e) increase burst and/or buckling limits of said expandable tube member.

* * * * *